United States Patent [19]

Motoyama et al.

[11] Patent Number: 5,959,644
[45] Date of Patent: Sep. 28, 1999

[54] METHOD OF AND APPARATUS FOR RECORDING IMAGES

[75] Inventors: Eiichi Motoyama, Tokyo; Koji Arai, Kawaguchi, both of Japan

[73] Assignee: Canon Kabushiki Kaisha, Tokyo, Japan

[21] Appl. No.: 08/842,880

[22] Filed: Apr. 17, 1997

Related U.S. Application Data

[63] Continuation of application No. 08/202,761, Feb. 28, 1994, abandoned.

[30] Foreign Application Priority Data

Mar. 4, 1993 [JP] Japan ..................................... 5-043785
May 31, 1993 [JP] Japan ..................................... 5-129384

[51] Int. Cl.$^6$ ............................... B41J 2/145; B41J 2/15; B41J 29/38
[52] U.S. Cl. ............................... 347/40; 347/12
[58] Field of Search ............................... 347/40, 100, 37, 347/43, 12; 358/298, 296

[56] References Cited

U.S. PATENT DOCUMENTS

| | | | |
|---|---|---|---|
| 4,313,124 | 1/1982 | Hara | 347/57 |
| 4,345,262 | 8/1982 | Shirato et al. | 347/10 |
| 4,459,600 | 7/1984 | Sato et al. | 347/47 |
| 4,463,359 | 7/1984 | Ayata et al. | 347/56 |
| 4,558,333 | 12/1985 | Sugitani et al. | 347/65 |
| 4,723,129 | 2/1988 | Endo et al. | 347/56 |
| 4,740,796 | 4/1988 | Endo et al. | 347/56 |
| 4,876,612 | 10/1989 | Honma et al. | 358/474 |
| 4,878,126 | 10/1989 | Ichikawa | 358/451 |
| 5,032,923 | 7/1991 | Kurtin et al. | 358/296 |
| 5,294,996 | 3/1994 | Sobue | 358/298 |
| 5,440,410 | 8/1995 | Sugishima | 347/3 |

FOREIGN PATENT DOCUMENTS

| | | |
|---|---|---|
| 0497440 | 8/1992 | European Pat. Off. . |
| 0526186 | 2/1993 | European Pat. Off. . |
| 59-123670 | 7/1984 | Japan . |
| 59-138461 | 8/1984 | Japan . |

*Primary Examiner*—N. Le
*Assistant Examiner*—Thinh Nguyen
*Attorney, Agent, or Firm*—Fitzpatrick, Cella, Harper & Scinto

[57] ABSTRACT

An image is recorded by repeating a recording operation which includes a main scanning operation performed by moving a recording head in which recording elements are arrayed in a direction perpendicular to a direction in which the recording elements are arrayed. A vertical scanning operation is performed by moving a recording medium in a direction perpendicular to the horizontal scanning direction through a distance corresponding to a recording width after the horizontal scanning operation is completed. When image data having a width narrower than a maximum recording width of the recording head is recorded, for example when a reduction recording is performed, a number of image data having the narrower width are combined so that image data having the maximum recording width can be recorded in one recording operation using the plurality of recording elements. Consequently, when image data having a width narrower than the maximum recording width of the recording head is recorded, the image quality and the recording speed are improved.

31 Claims, 18 Drawing Sheets

FIRST SCANNING

SECOND SCANNING

FIG. 3(a)
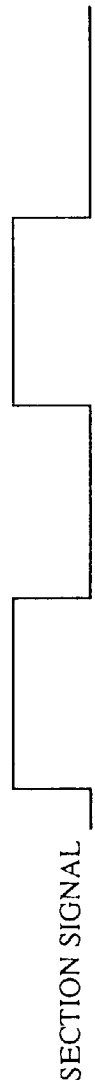
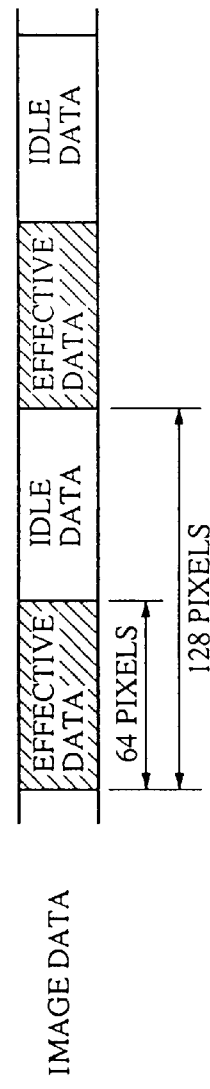
FIG. 3(b)
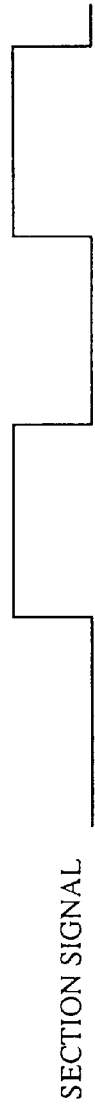
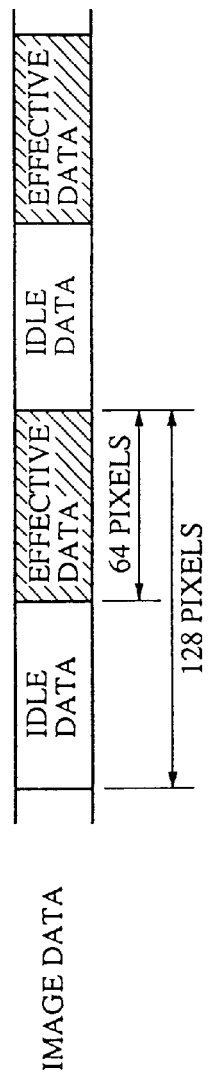

| CLOCK 1 | CLOCK 2 | COLOR |
|---------|---------|-------|
| 0 | 0 | K |
| 1 | 0 | C |
| 0 | 1 | M |
| 1 | 1 | Y |

FIG. 16
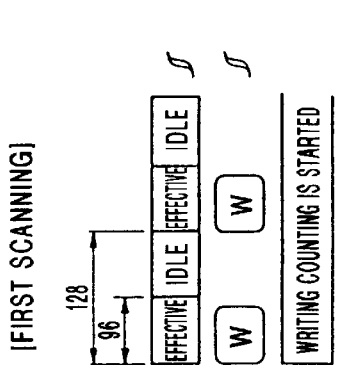
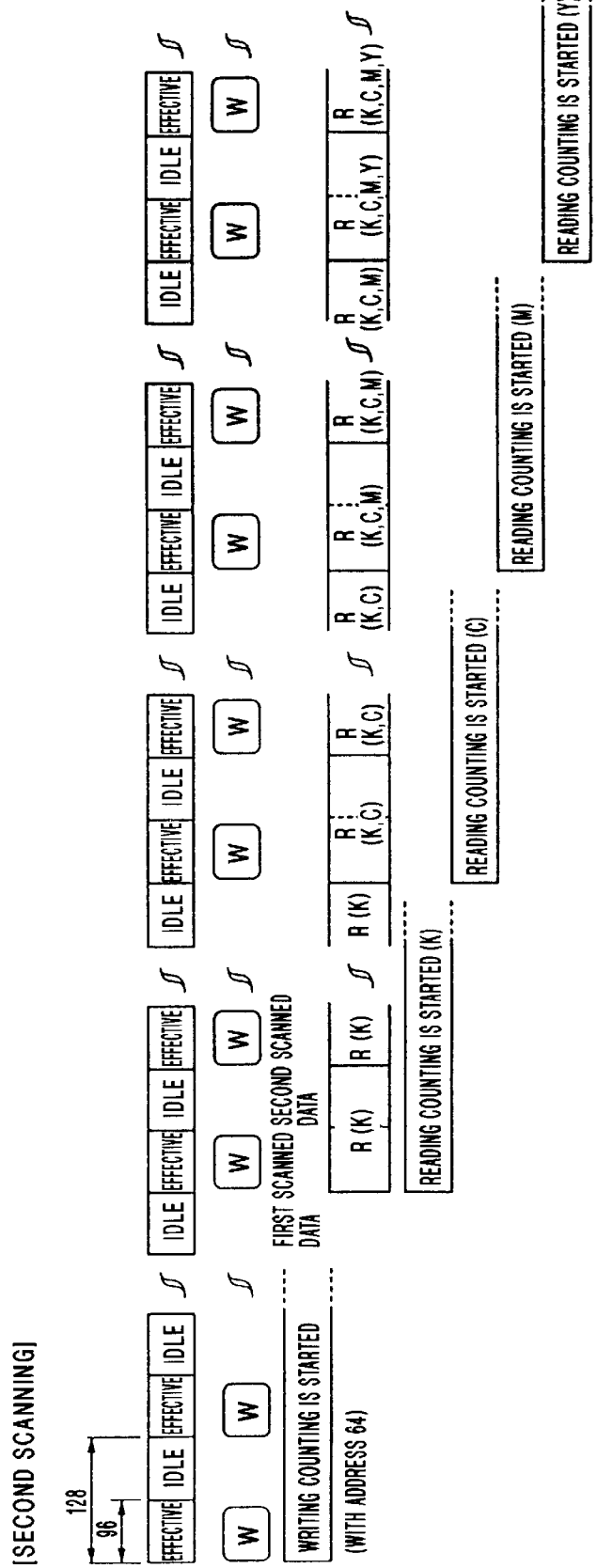

METHOD OF AND APPARATUS FOR RECORDING IMAGES

This application is a continuation of application Ser. No. 08/202,761, filed Feb. 28, 1994, now abandoned.

BACKGROUND OF THE INVENTION

1. Field of the Invention

The present invention relates to a method of recording images on a recording material using a recording head having a plurality of recording elements as well as an apparatus therefor.

2. Description of the Related Art

Conventional ink jet or thermal printers are designed such that they record images first by performing main (horizontal) scanning by moving a recording head, in which a plurality of recording elements are arrayed, in a direction (a horizontal scanning direction) different from that in which the recording elements are arrayed and then by conveying a recording medium in a direction substantially perpendicular to the horizontal scanning direction through a distance corresponding to a recording width after the horizontal scanning is completed.

FIG. 18 illustrates how such a printer performs printing. Reference numeral 101 denotes a recording medium. Reference numeral 102 denotes a recording head in which a plurality of recording elements are arrayed. The recording head 102 is capable of recording an image consisting of 128 pixels on the recording medium 101 in one recording operation.

To form an image of one screen using the above-described type of recording head, recording of a width of 128 pixels is first performed at a pretermined density (period) by moving the recording head 102 in a direction indicated by an arrow 103 at a predetermined speed (main (horizontal) scanning) to form a band image having a width of 128 pixels.

After the recording medium 101 is moved through a distance corresponding to the width of 128 pixels in a direction indicated by an arrow 104 (sub (vertical) scanning), recording is performed again by moving the recording head 102 in a direction indicated by the arrow 103, whereby an image having a width of a total of 2 bands, i.e., 2×128 pixels, is formed.

An image of one screen is formed by repeating a sequence of those operations a predetermined number of times.

The above-described printer may be connected to a reader so that it can record data representing an image of an original read by a scanner. In such a case, a reading head constructed such that the reading operation thereof is associated with the operation of the above-described recording head may be used, and one screen of the image of the original may be read in the same scanning method as the scanning method of the recording head.

More specifically, such a reading head has a sensor capable of reading 128 pixels in one reading operation, and the reading direction of the reading head corresponds to the recording direction of the recording head. Accordingly, the image read by the reading head in one reading operation is recorded by the recording head in one recording operation.

FIG. 19 is a block diagram of a copying machine which contains the above-described type of reading and recording mechanisms.

Reference numeral 110 denotes an image reading portion (scanner) having the above-described type of reading mechanism. Reference numeral 111 denotes an image processing portion for performing predetermined processes on the image data read by the scanner 110. Reference numeral 113 denotes an image recording portion (printer) having the above-described type of recording mechanism. Reference numeral 112 denotes a head shading portion (HS) for correcting irregularities of the recording head using the input image data.

The recording head has recording elements respectively corresponding to 128 pixels. The recording elements perform recording utilizing, for example, thermal energy. If the recording head is of a thermal transfer type, the recording elements are heating elements. If the recording head is of an ink jet recording type, the recording elements are ink nozzles.

All of these plurality of recording elements do not reproduce the same density when they receive the same amount of thermal energy, i.e., there are variations in the density provided by the recording elements.

The conventional recording head adopts the binary reproduction method. In this method, a reproduced virtual density is adjusted by correcting the average densities near a single recording element.

FIG. 20 shows the structure of the HS portion 112.

Reference numeral 116 denotes a HS-RAM formed of a RAM for the convenience of exchange of the recording head. The HS-RAM stores variations in the recording elements of the recording head in a numerical form. Reference numeral 117 denotes a HS-ROM which outputs corrected image data from both the output of the HS-RAM 116 and the image data.

FIG. 21 shows the structure of the printer portion 113.

Reference numeral 120 denotes a binarizing portion for binarizing input image data and for outputting the binarized image data. The binarizing portion 120 is capable of performing adequate binarization, such as the dither method or the error diffusion method, on natural images, such as character images or photographs. Reference numeral 121 denotes a buffer memory for temporarily storing the binarized image data obtained by the binarizing portion and for sending the stored image data to the recording head 122.

In the copying machine arranged in the manner described above, image data of 128 pixels read by the scanner portion 110 is output to the image processing portion 111 in sequence. The image processing portion 111 performs predetermined processes on the image data and sends the processed data to the head shading portion 112. The image data on which variations of the recording head have been corrected by the head shading portion 112 is binarized by the binarizing portion 120. The binarized data is stored in the buffer memory 121. When the image data of 128 pixels are stored in the buffer memory 121, the recording head 122 starts recording.

If the image data processing speed is sufficiently faster than the horizontal scanning speed of the recording head and if the the response speed of the recording head can be made to correspond to the image data processing speed, the image data may be sequentially recorded at the processing speed of the image data without the image data of 128 pixels being stored in the buffer memory 121.

To obtain a reduced image of the original, only m pixels corresponding to 64 pixels (half of the recording head) of a reduced image are made effective in one reading operation, as shown in FIG. 22. First, recording of the former 64 pixels of the recording head is performed in the first horizontal scanning operation (a), and then the scanner portion alone is moved for vertical scanning without the printer portion being moved for vertical scanning. Thereafter, recording of the latter 64 pixels is performed in the second horizontal scanning operation, and then both the scanner portion and the printer portion are moved for vertical scanning (b).

If the reduction rate is 50%, the number of pixels which are made effective in the first horizontal scanning operation is obtained as follows:

$$m \times 50\% = 64 \text{ pixels}, m=128$$

If the reduction rate is 64%, $$m \times 64\% = 64 \text{ pixels}, m=100$$

The amount of movement for vertical scanning of the scanner portion is m pixels.

In the printer portion, after recording of 64 pixels is performed using the upper half recording elements of the recording head, recording of 64 pixels is performed using the lower half recording elements of the recording head without the recording medium being conveyed. Thereafter, the recording medium is conveyed. Thus, the amount of movement of the recording head for vertical scanning is always 128 pixels. In the head shading portion 112, image data is corrected according to nozzle number.

However, in the above-described conventional reduction recording method, since the recording elements of 64 pixels out of 128 pixels are used alternately, some elements of the recording head are used for recording while the other elements are not used in one horizontal scanning operation.

Accordingly, heat for recording is transferred from the recording elements which are used for recording to the recording elements which are not used near the center of 128 pixels, affecting these recording elements which are not used. Thus, these recording elements may have thermal energy more than that required when they are used next time. Further, the heat of the recording elements which are used is transferred to the recording elements which are not used, and the recording elements cannot perform recording at the normal level of thermal energy.

Consequently, a stripe-shaped density irregularity may be generated at every 128 pixels.

Hence, a HS portion exclusively used for removal of such a density irregularity may be provided. However, the number of such HS portions must be the same as the number of portions into which the recording elements are divided for reduction, thus increasing production cost or the size of the copying machine.

Further, in the case of, for example, down to 50% of reduction, if the width of reading is 128 pixels, the reduced image has a width which is less than 128 pixels and not less than 64 pixels. At that time, the effective image has a width corresponding to 64 pixels, and the remaining image is discarded and read again in a subsequent band.

Thus, a total number of scanning operations required to scan one page in reduction recording increases from the number of scanning operations required for a life-size recording. If the reduction rate is, for example, 99%, the total number of scanning operations is about twice that for life size recording, thus increasing the copying time by a factor of about 2.

SUMMARY OF THE INVENTION

In view of the aforementioned problems, a primary object of the present invention is to provide an improved image recording method and an apparatus therefor.

Another object of the present invention is to provide an image recording method and an apparatus therefor which enable the image quality with which image data having a width narrower than that of the maximum recording area of a recording head is recorded to be improved at a low cost.

Still another object of the present invention is to provide an image recording method and an apparatus therefor which enable a recording speed at which image data having a width narrower than that of the maximum recording area of a recording head is recorded to be increased.

Still another object of the present invention is to provide an image recording method and an apparatus therefor for recording image data at a recording width wider than that of image data by combining plurality of image data each having a width narrower than the maximum recording width of a recording head.

To achieve the aforementioned objects, the present invention provides in one aspect thereof a method of and an apparatus for recording an image representing input image data using a recording head in which a plurality of recording elements are arrayed by repeating a recording operation which includes a main scanning operation in a direction different from that in which the plurality of recording elements are arrayed and a sub scanning operation performed by moving the recording head relative to a recording medium through a distance corresponding to the recording width of the recording head after the main scanning operation is completed. When the width of the input image data is narrower than the maximum recording width at which the plurality of recording elements of the recording head can perform recording in one main scanning operation, plurality of image data having the narrower width are combined, and the plurality of recording elements are driven according to the combined image data to record an image.

The present invention provides in another aspect thereof a method of and an apparatus for recording an image representing input image data using a recording head in which a plurality of recording elements are arrayed by repeating a recording operation which includes a main scanning operation in a direction different from that in which the plurality of recording elements are arrayed and a sub scanning operation performed by moving the recording head relative to a recording medium through a distance corresponding to the recording width of the recording head after the main scanning operation is completed. When the width of the input image data is narrower than the maximum recording width at which the plurality of recording elements of the recording head can perform recording in one main scanning operation, plurality of image data having the narrower width are combined, and the plurality of recording elements are driven according to the combined image data to record an image. In the combined image data, the image data exceeding the maximum recording width is stored in storage means, so that subsequently input image data is combined with the image data stored in the storage means, and the plurality of recording elements are driven for recording according to the combined image data.

The above and further objects will become apparent from the following description of drawings and embodiments with reference to the accompanying drawings.

BRIEF DESCRIPTION OF THE DRAWINGS

FIGS. 3(a) and 3(b) illustrate examples of input images in the present invention;

FIG. 16 is a timing chart showing the reduction copying operation of the fifth embodiment of the present invention;

DETAILED DESCRIPTION OF THE PREFERRED EMBODIMENTS

Embodiments of the present invention will now be described with reference to the accompanying drawings.

First Embodiment

Figure 1:
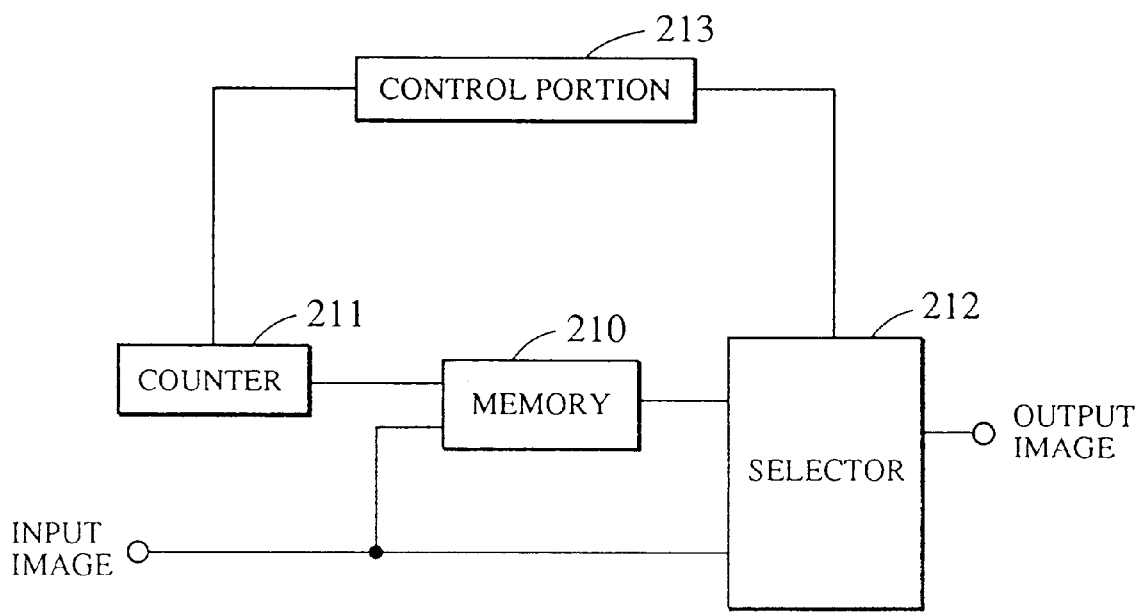
FIG. 1 is a block diagram of a first embodiment of the present invention.

FIG. 1 is a block diagram showing the structure of the printer portion 113 of a first embodiment of the present invention. The printer portion 113 receives image data and sends the received data to the recording head portion. The other structure of the ink jet type copying machine shown in FIG. 1 is the same as that shown in FIGS. 18 through 21, description thereof being omitted.

In FIG. 1, reference numeral 210 denotes a memory for storing image data. Reference numeral 211 denotes an address counter for supplying an address to the memory 210. Reference numeral 212 is a switch (a selector) for selecting either the image data from the memory 210 or input image data. Reference numeral 213 denotes a control portion for controlling the respective components.

In the following description, if the recording pixels of a recording head 122 are 128 pixels and if the reduction rate is 50%, the number of sections N is 2. Thus, the capacity of the memory 210 is $1-(1\div2)=\frac{1}{2}$ bands.

Figure 2:
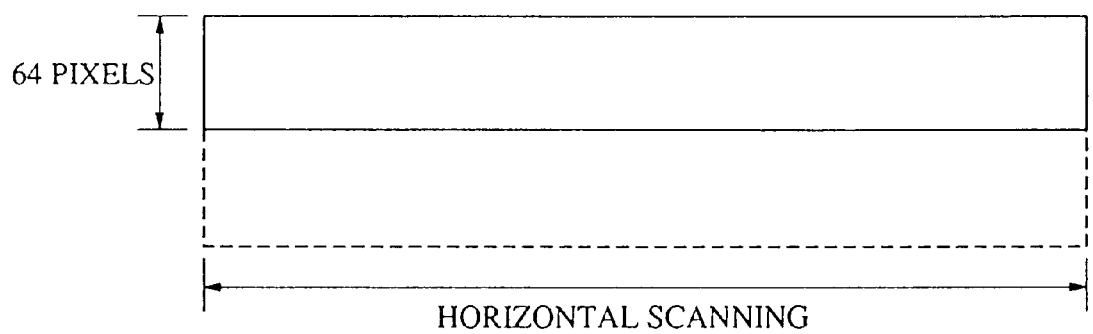
FIG. 2 illustrates the usage of a memory in the first embodiment of the present invention.

FIG. 2 is a schematic view of the memory 210 having a capacity of ½ of a single band. In the reduction copying operation, the memory 210 is used as a memory having dimensions of 64 pixels×the horizontal scanning width.

(The life size recording operation).

In the life size copying operation, the switch 212 is changed over to a side in which image data does not pass through the memory 210 so that the input image data can be sent to the recording portion without change.

(The reduction copying operation).

In the reduction copying operation, the image data obtained in each scanning arrive at a period corresponding to 128 pixels, although the image data corresponding to only 64 pixels are effective.

FIG. 3(a) shows an input image in the first scanning operation. FIG. 3(b) shows an input image in the second scanning operation.

An input image is composed of image data, a section signal and an image clock.

Regarding the image obtained in the first scanning operation, the address supplied to the memory 210 is set to 0 by clearing the counter 211. The switch 212 is turned to either side. Writing is instructed to the memory 210, and the input image data is written in the memory 210 while the address is sequentially counted up.

At that time, the address counter is used as a writing address counter. Further, the actual recording operation is not performed, i.e., only storage of the image data in the memory 210 is performed.

Regarding the image obtained in the second scanning operation, the timing of the input image data is delayed by a time corresponding to 64 pixels (effectiveness or idleness is indicated by a section signal). The address supplied to the memory 210 is set to 0 by clearing the counter 211. The switch 212 is turned to the side of the memory 210. Reading is instructed to the memory 210, and the image data is read out to the recording head portion while the address is sequentially counted up.

After the image corresponding to 64 pixels in the memory 210 has been read out, counting up of the counter 211 is stopped, and the switch 212 is turned to the input image side so that the delayed input image corresponding to 64 pixels can be sent to the recording portion.

The switch 212 is turned to the side of the memory 210, and counting of the counter 211 is started again to send the image corresponding to 64 pixels in the memory 210 to the recording portion.

A series of above-described operations are repeated to record a single band image having a width of 128 pixels.

Second Embodiment

Figure 4:
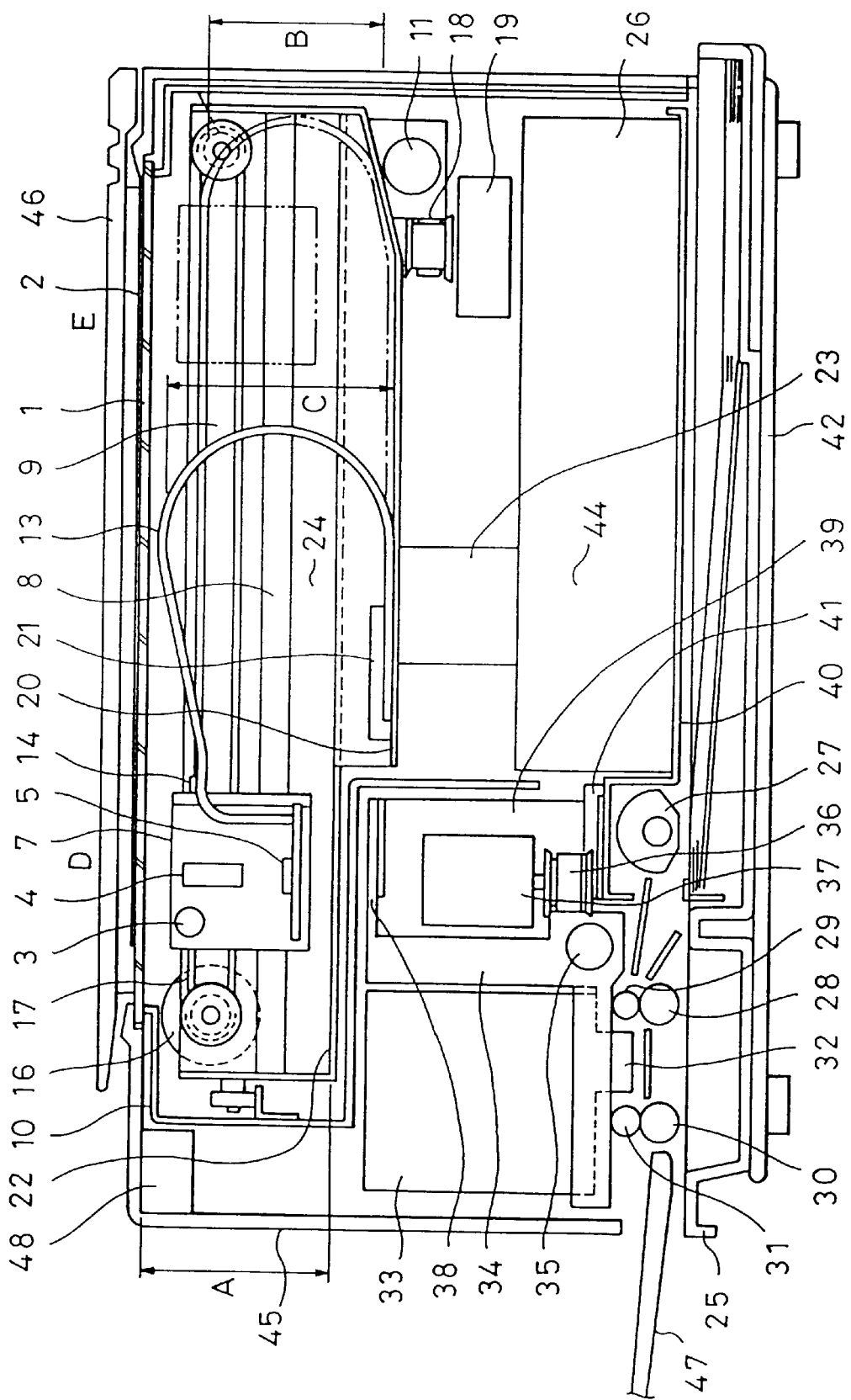
FIG. 4 is a cross-sectional view of a color copying machine showing a second embodiment of the present invention.

FIG. 4 is a cross-sectional view of a color copying machine which adopts the ink jet recording method.

The color copying machine includes an image reading and processing portion (hereinafter referred to as a reader portion 24), and a printer portion 44. The reader portion 24 contains a CCD line sensor 5 (see FIG. 5) having filters of three color components consisting of R, G and B. The line sensor 5 reads an image of an original 2 placed on an original glass base 1 by scanning, and sends, through an image processing circuit, to the printer portion 44 which contains ink jet heads of cyan (C), magenta (M), yellow (Y) and black (B) colors. The ink jet head performs recording of the image.

The operation of the color copying machine will now be described.

The reader portion 24 is made up of members 1 through 23, and the printer portion 44 is made up of members 25 through 43. In this structure, the left upper side of FIG. 1 represents the front surface of the machine.

The printer portion 44 contains an ink jet head (a recording head) 32 which performs recording by causing a change in the state of the ink using thermal energy and thereby discharging an ink droplet from a discharge port. The recording head 32 has a structure in which, for example, 128 nozzles are arrayed at a pitch of 63.5 microns ($\mu$m) in the longitudinal direction (the vertical scanning direction which will be described later), and is capable of recording at a width of 8.128 millimeter (mm) in one recording operation. Thus, recording is conducted on a sheet of recording paper by repeating the operation which includes recording of an image at a width of 8.128 mm and feeding of the recording paper through 8.128 mm for a subsequent recording. Hereinafter, the direction of recording by the recording head is called the horizontal scanning direction, and the direction perpendicular thereto in which the recording paper is fed is called the vertical scanning direction. In FIG. 4, the direction perpendicular to the surface of the paper is the horizontal scanning direction, and the rightward and leftward direction of the paper is the vertical scanning direction.

The reader portion 24 repeatedly reads the original 2 at a width of 8.128 mm in response to the operation of the printer portion 44. The direction of reading by the reader portion 24 is called the horizontal scanning direction, and the direction in which the reader portion 24 is moved for a subsequent reading is called the vertical scanning direction. In this structure, the rightward and leftward direction of the paper is the horizontal scanning direction, and the direction perpendicular to the surface of the paper is the vertical scanning direction.

The operation of the reader portion 24 will be described below.

The original 2 on the original glass base 1 is illuminated by a lamp 3 on a horizontal scanning carriage 7, and an image of the original 2 is led to a light-receiving element 5 (a CCD line sensor) through a lens array 4. The horizontal scanning carriage 7 is in engagement with a horizontal scanning rail 8 on a vertical scanning unit 9 and is slidable along the rail 8. Also, the horizontal scanning carriage 7 is coupled to a horizontal scanning belt 17 by means of an engaging member which is not shown so that it can be moved by a horizontal scanning motor 16 in the rightward and leftward directions of FIG. 4 for horizontal scanning.

The vertical scanning unit 9 is in engagement with a vertical scanning rail 11 fixed to an optical frame 10, and is slidable along the vertical scanning rail 11. Also, the vertical scanning unit 9 is coupled to a vertical scanning belt 18 by means of an engaging member which is not shown so that it can be moved in the direction perpendicular to the surface of the paper by a vertical scanning motor 19 for the vertical scanning operation.

The image signal read by the CCD 5 is transmitted to the vertical scanning unit 9 via a looped signal cable 13. One end of the signal cable 13 is bit by a biting portion 14 on the horizontal scanning carriage 7, and the other end thereof is coupled to a vertical scanning signal cable 23 fixed to a bottom surface 20 of the vertical scanning unit 20 by means of a member 21 to couple the vertical scanning unit 9 to an electric unit 26 of the printer 44. The signal cable 13 follows the movement of the horizontal scanning carriage 9, and the vertical scanning signal cable 23 follows the movement of the vertical scanning unit 9.

The operation of the printer portion 44 will now be described.

Sheets of recording paper are sent out from a recording paper cassette 25 one at a time by means of a paper feeding roller 27 driven by a power source which is not shown. Recording is performed on the recording paper by the recording head 32 between two pairs of rollers 28, 29 and 30, 31. The recording head 32 is formed integrally with an ink tank 33. The recording head 32 with the ink tank 33 is removably placed on a printer horizontal scanning carriage 34. The printer horizontal scanning carriage 34 is in engagement with a printer horizontal scanning rail 35, and is slidable along the rail 35.

Also, the printer horizontal scanning carriage 34 is coupled to a horizontal scanning belt 36 by means of an engaging member which is not shown so that it can be moved in the direction perpendicular to the surface of the paper for the horizontal scanning operation by a horizontal scanning motor 37.

The printer horizontal scanning carriage 34 has an arm portion 38 to which a printer signal cable 39 for transmitting signals to the recording head 32 is fixed. The other end of the printer signal cable 39 is fixed to a printer intermediate plate 40 by means of a member 41, and then coupled to the electrical unit 26. The printer signal cable 39 follows the movement of the printer horizontal scanning carriage 34, and it does not come into contact with the optical frame 10 located above the cable 39.

The vertical scanning of the printer portion 44 is performed by moving the sheet of recording paper through 8.128 mm in each operation using a power source which is not shown. Reference numeral 42 denotes a bottom plate of the printer portion. Reference numeral 45 denotes an exterior plate. Reference numeral 46 denotes an original pressing plate. Reference numeral 47 denotes a paper discharge tray. Reference numeral 48 denotes an operation portion.

Figure 5:
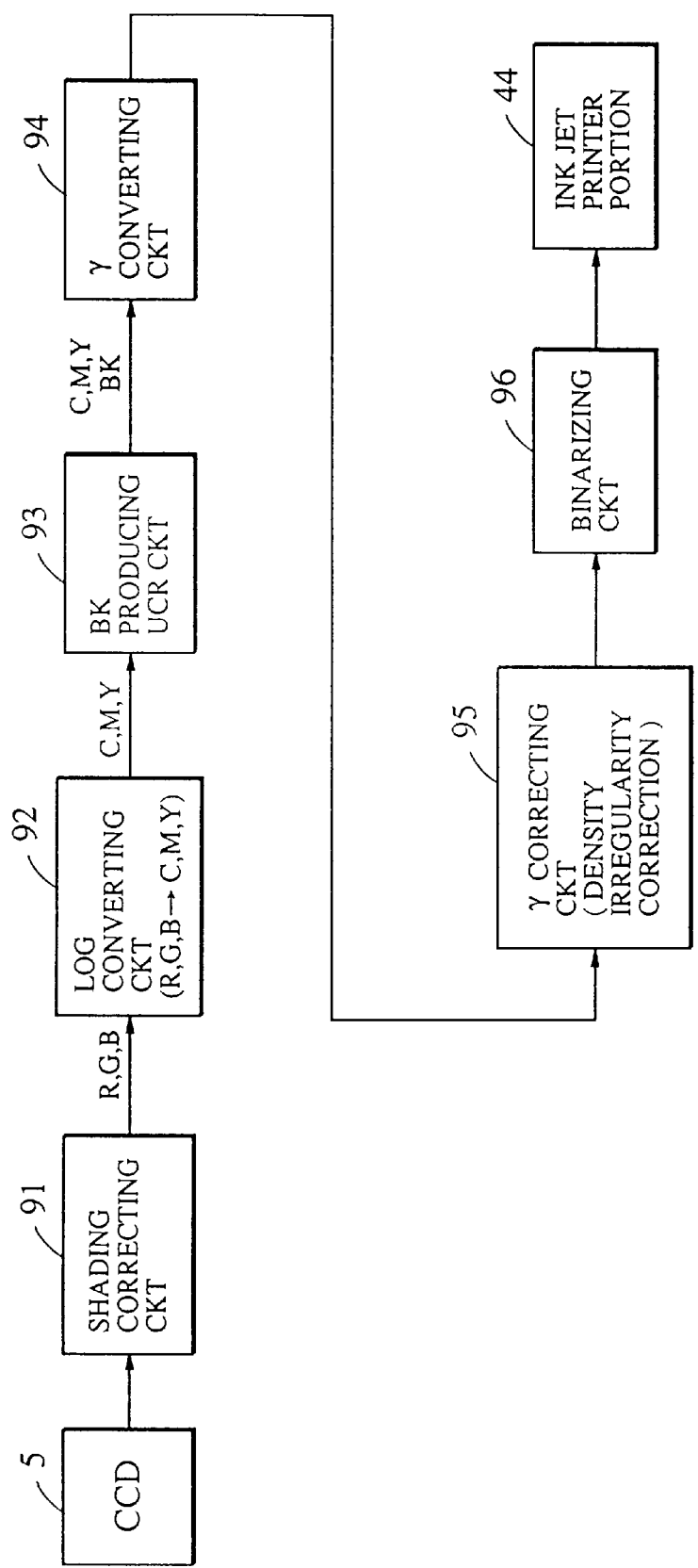
FIG. 5 is a block diagram of a signal processing system of the color copying machine of FIG. 4.

FIG. 5 is a block diagram of a signal processing system of the color copying machine shown in FIG. 4. A shading correcting circuit 91 corrects the sensor sensitivity of the image signal read by the CCD sensor 5, which is a solid imaging device. A LOG converting circuit 92 converts three primary colors of light, R (red), G (green) and B (blue), into three primary colors of a color (a printing color) of C (cyan), M (magenta) and Y (yellow). A Bk producing UCR circuit 93 extracts a Bk (black) portion produced by the mixture of three colors of C, M and Y as a component common thereto or extracts part of the common component as a black component, and inputs C, M, Y, Bk signals to a γ converting circuit 94.

To calculate output data from input data, the γ converting circuit 94 normally contains several functions from which an adequate function is selected according to the density balance of each color or a user's desired tone of a color. The functional curve is determined according to the characteristics of the ink or of recording paper.

A practically employed example of the correcting process in this embodiment will now be described.

The γ correcting circuit 95 inputs the output signal of the γ converting circuit 94, and has many correction functions having different gradients. When a straight line whose gradient is 45 degrees is selected as the correction function, the input signal is output without change. When a straight line whose gradient is smaller than 45 degrees is selected as the correction function, the γ correcting circuit 95 multiplies the input signal by a constant smaller than "1", and outputs the resultant signal. If this function is made to correspond to, for example, the portion of the recording head 32 having a high density, the input image data is corrected to data having a density lower than an actual density.

When a straight line whose gradient is larger than 45 degrees is selected as the correction function, the γ correcting circuit 95 multiplies the input signal by a constant larger than "1", and outputs the resultant signal having a density higher than the actual one. Thus, this correction is effective to the portion of the recording head 32 having a low density.

In this embodiment, the plurality of functions are made to correspond to the discharge ports of the recording head 32, respectively. The γ correcting circuit 95 γ corrects the input signal for each discharge port, and sends the resultant signal to a binarizing circuit 96. The binarizing circuit 96 has the function of converting the multilevel data of each pixel into binary data of either "1" or "0", and performs binarization using the dither method, the error diffusion method or the average density method. In this embodiment, the error diffusion method is used. The results of the binarization process are output to the printer portion 44.

Figures 6, 9:
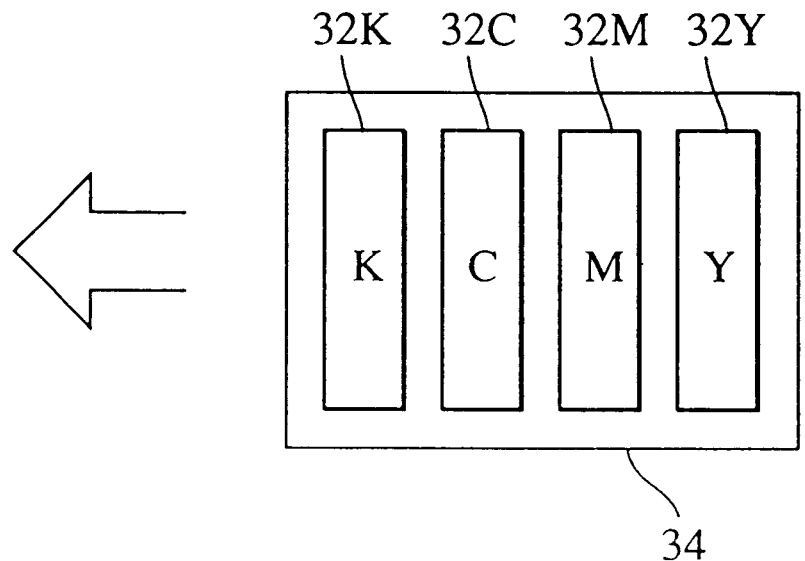
FIG. 6 is a schematic view of a recording portion of the second embodiment of the present invention.
FIG. 9 shows a logic of a block shown in FIG. 8.

FIG. 6 is a schematic view of an ink jet printer shown in FIG. 5. On the carriage 34 are mounted a head 32K for black, a head 32C for cyan, a head 32M for magenta and a head 32Y for yellow.

Recording of an image is performed by scanning the carriage in the direction indicated by the arrow. In order to perform recording in a full color, deviations of the positions where the heads of respective colors are mounted must be corrected.

Hence, the position of, for example, the head 32K is used as a reference position, and the image data required for each of the heads 32C, 32M and 32Y to reach the position where the head 32K has performed recording may be stored in a memory buffer.

Figure 7:
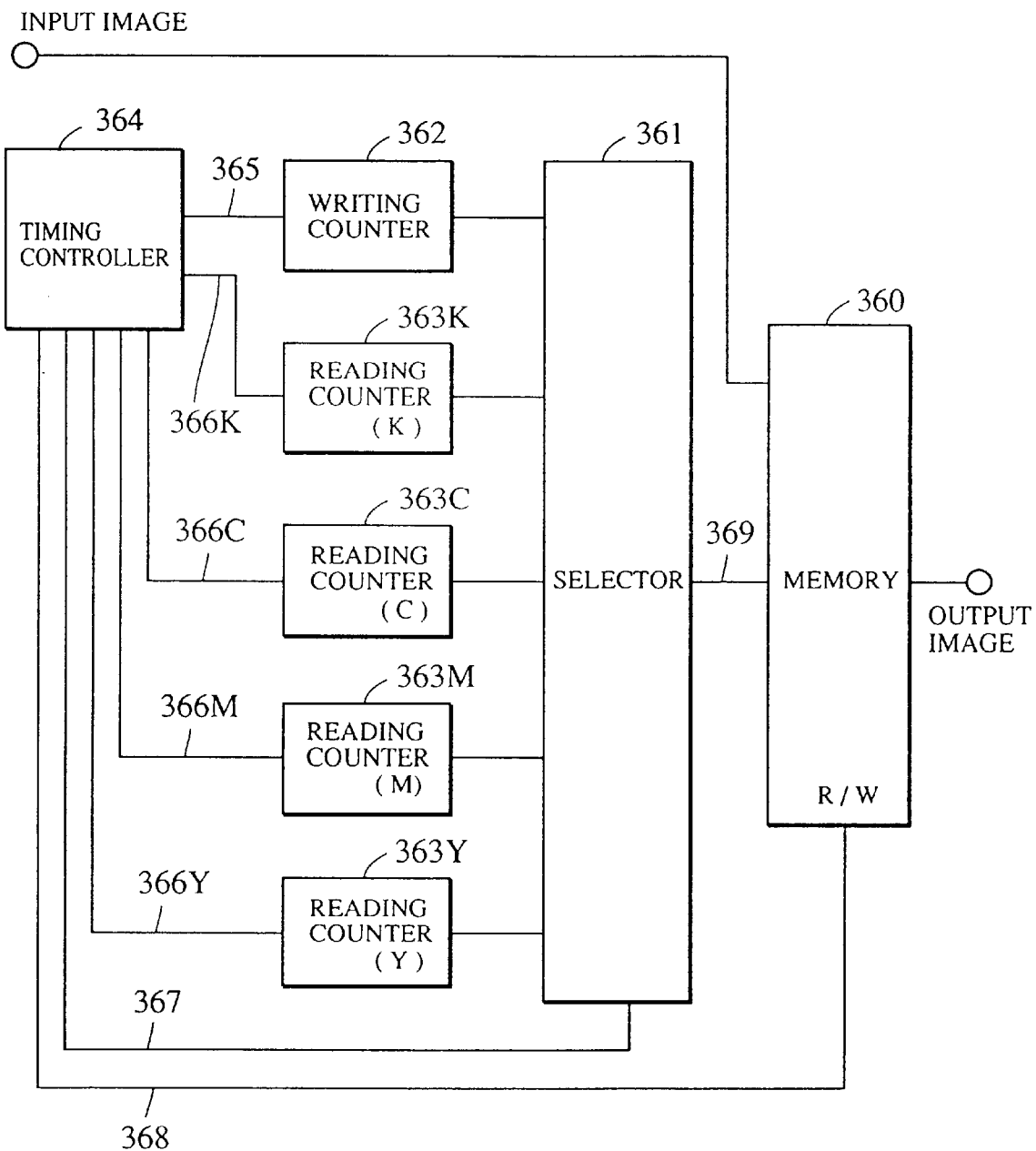
FIG. 7 is a block diagram of a printer portion of the second embodiment of the present invention.

FIG. 7 is a block diagram showing the circuit structure of the vicinity of that memory buffer. The circuit shown in FIG. 7 contains the function which carries out the present invention.

Reference numeral 360 denotes a memory for storing an image. Reference numeral 362 denotes an address counter for supplying an address to the memory 360 to write the image data therein. Reference numeral 363 denotes an address counter for supplying an address to the memory 360 to read out the image data therefrom. The address counter 363 includes an address counter 363K for black, an address counter 363C for cyan, an address counter 363M for magenta and an address counter 363Y for yellow. Reference numeral 361 denotes a selector for selecting the output of the writing counter or the output of the reading counter and for supplying the selected output to the memory 360 via a line 369. Reference numeral 364 denotes a timing controller which controls counting of the counters 362 and 363 via lines 365, 366K, 366C, 366M and 366Y and switches over the selector and the memory between reading and writing via lines 367 and 368, respectively.

Figure 8:
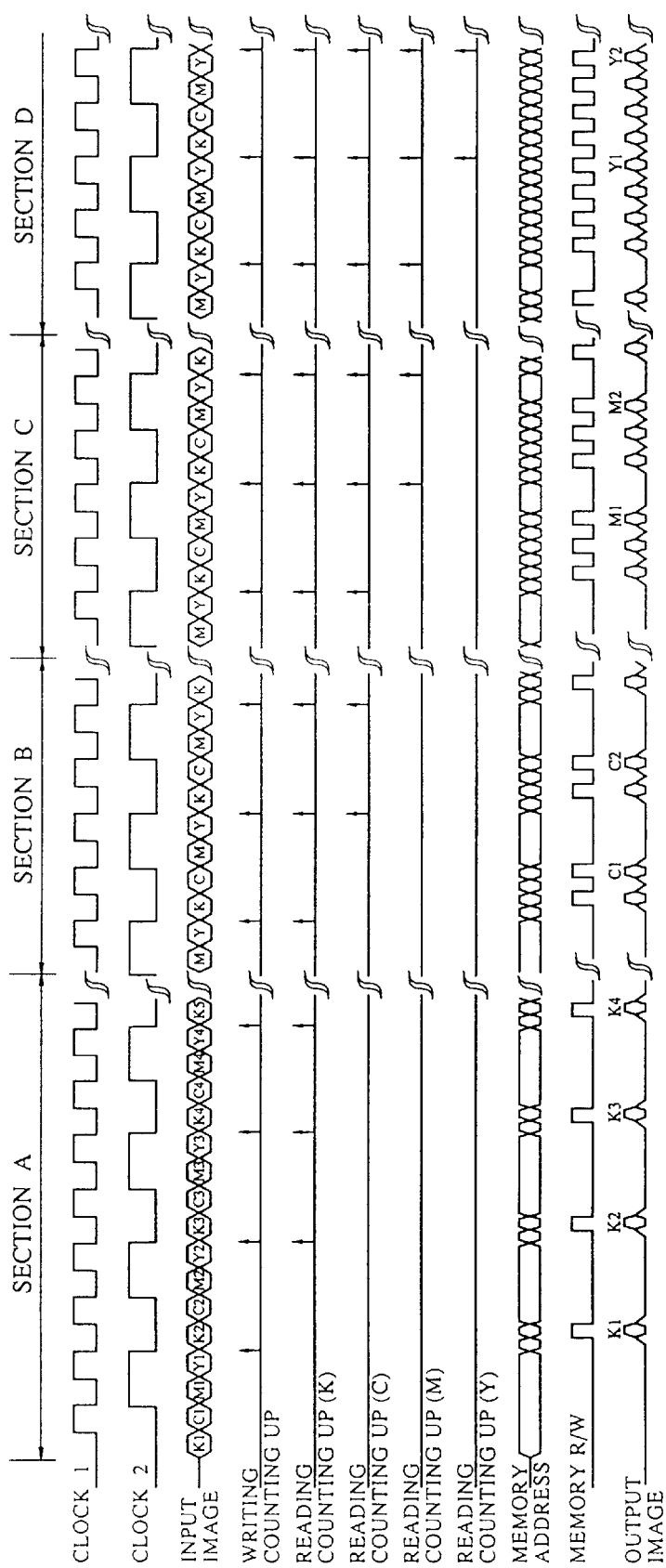
FIG. 8 is a timing chart showing the life size copying operation in the second embodiment of the present invention.

If the memory 360 is formed of a dual port RAM, the provision of the selector 361 is unnecessary.
(The operation for life-size recording)
For the life-size recording operation, the memory 360 is used as a delay buffer for correcting deviations of the positions of the respective heads, as mentioned above. FIG. 8 is a timing chart of the life-size recording operation.

Clocks 1 and 2 are part of image clocks and used as color identifying signals. An image is input at each pixel which is arranged in the order of black (Bk), cyan (C), magenta (M) and yellow (Y). The relation between clocks 1 and 2 and colors is shown in FIG. 9. For explanation, four colors are represented by one pixel, and one color is represented by one color pixel.

During the writing in the memory 360, counting up is conducted for each pixel because the memory 360 is divided into four blocks for use by inputting clocks 1 and 2 at the high order of an address.

For reading from the memory 360, a fixed signal is supplied from the counter of each color to the upper order of the memory 360 as a color signal.

In section A, data of black is read out one pixel later from the memory and sent to the recording portion. If image input starts concurrently with the starting of the reading out of the data of black, data of black may be output without delay.

In section B, data of cyan is read out from the memory delayed. In section C, data of magenta is read out delayed. In section D, data of yellow is read out delayed. The amount of delay may be an absolute value which is obtained using the horizontal scanning movement starting point or black data read out starting point as a reference, or may be a relative value obtained using the previous color reading out starting point as a reference.

The memory capacity required for each color is (the amount of delay of data of each color+1). 1 is added because each data is written in the memory once. In this embodiment, since the single memory is divided into four sections, the memory capacity required for the memory 360 is
((the amount of delay of data of yellow)+1)×4
(The operation for reduction recording)

In reduction recording, the image obtained in each scanning arrives at a period corresponding to 128 pixels, although the image corresponding to only 64 pixels are effective.

In reduction recording, the image obtained in the first scanning operation is merely stored in the memory 360, as in the case of the first embodiment, If the reduction rate is down to 50%, the number of divisions is 2, and the memory capacity required for storage corresponds to ½ bands.

Next, the image obtained in the second scanning operation is input. During this time, the image of the second scanning operation is combined with the previously stored image corresponding to 64 pixels and the combined image is recorded.

At that time, since deviations in the positions of the respective recording heads must be corrected, as in the case of the life-size recording, the input image is output delayed in the same manner as that of the life-size recording by using the memory 360.

The memory capacity required for each color in the second scanning operation is (the amount of delay of data of each color+1). 1 is added because each data is written in the memory once. In this embodiment, since the single memory is divided into four sections, the memory capacity required for the memory 360 is
((the amount of delay of data of yellow)+1)×4

Figure 10:
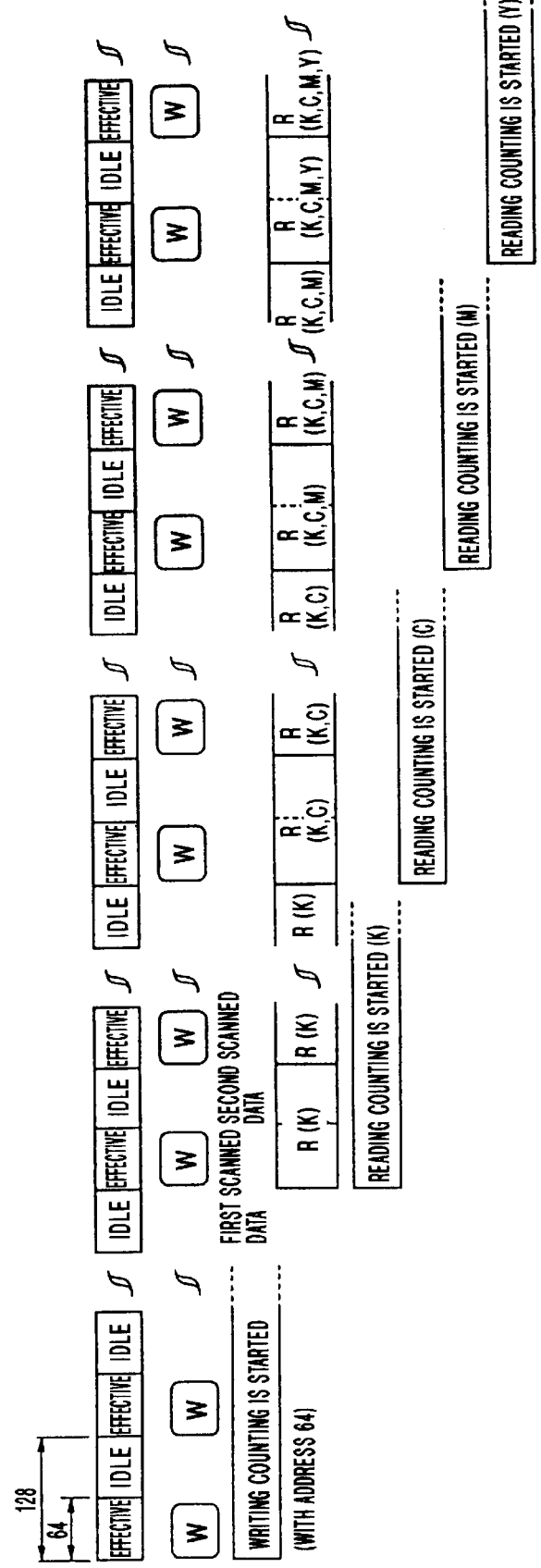
FIG. 10 is a timing chart showing the reduction copying operation in the second embodiment of the present invention.

FIG. 10 illustrates the operation of the second embodiment of this invention. In the first scanning operation, effective 64 pixels and idle 64 pixels in 128 pixels are continuously input, and only the effective pixels are written in the memory 360. However, the writing counter 362 continuously counts up starting with address 0, and the effective image data is thus written in the memory 360 at every 64 addresses.

Next, in the second scanning operation, only 64 effective pixels are written in the memory 360, as in the case of the first scanning. At that time, writing starts with address 64. This is the area where no image data is written in the first scanning operation.

When the image data is to be sent to the recording portion, output starts with the data written in the first scanning operation. Counting up of the reading counter 363 starts with address 0. Thus, the data obtained in the first and second scanning operations are combined and output sequentially.

In FIG. 10, the data obtained in the first scanning operation is output in a period of "effective data". However, that data may be output in a period of "idle data" or over two periods.

In this embodiment, a binary recording head is used, as in the case of the conventional printer. Therefore, an image signal is processed in the memory 360 as a binary signal. However, the image signal may also be a multilevel image signal. In addition, a multilevel recording head which employs concentration ink or whose dot diameter is variable may also be used.

Further, since recording of 128 pixels is conducted at a high speed as compared with the time required for the horizontal scanning, sequential recording of 128 pixels one pixel at one time does not cause an image to be inclined. However, recording at every 128 pixels may also be conducted, as in the case of the conventional printer. This is achieved by providing a buffer behind the memory.

Third Embodiment

Figure 11:
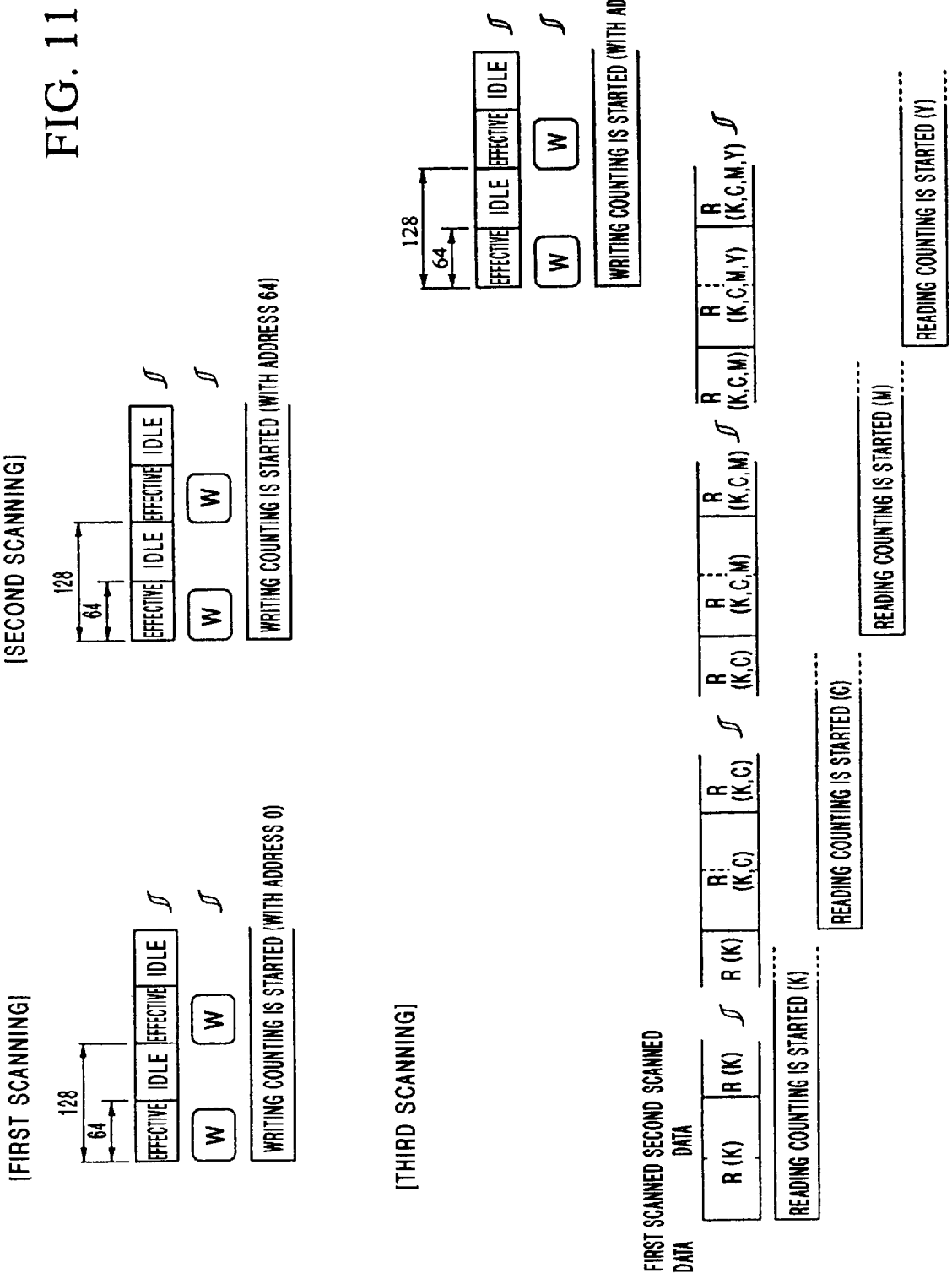
FIG. 11 is a timing chart showing the reduction copying operation in a third embodiment of the present invention.

FIG. 11 illustrates the operation of a third embodiment of the present invention. The color printer of the third embodiment has a structure similar to that of the second embodiment, and the basic operation thereof is thus the same as that of the second embodiment.

However, the memory 360 has a capacity of at least one band so that one band image data can be stored beforehand by reading an original while the recording medium is conveyed to a recording starting position in order to improve the throughput of the image formation.

In FIG. 11, writing of the effective image obtained in the first scanning operation starts with address 0, and writing of the effective image obtained in the second scanning operation starts with address 64, as in the case of the second embodiment.

In the third scanning, data in the memory 360 is first sequentially read in the order of black, cyan, magenta and yellow.

When at least one pixel of last yellow has been read and the memory 360 has a space, writing is enabled. Accordingly, image data is written in the memory 360 thereafter.

Regarding the fourth and subsequent scanning operations, the operation for the second scanning may be performed or the operation for the second scanning in the second embodiment may be performed.

As will be understood from the foregoing description, in the third embodiment, the memory has a capacity of at least (1−1/N) bands where N is the number of divisions (N:natural number of 2 or above). When the recording head is used in a state wherein it is divided into several portions for, for example, reduction recording, the data obtained by conducting reading (N−1) times is stored in the memory, and one band image is recorded using all the recording elements of the recording head while conducting the final reading. In this way, the above-described problem can be solved, and the image quality can thus be improved.

Fourth Embodiment

Figure 12:
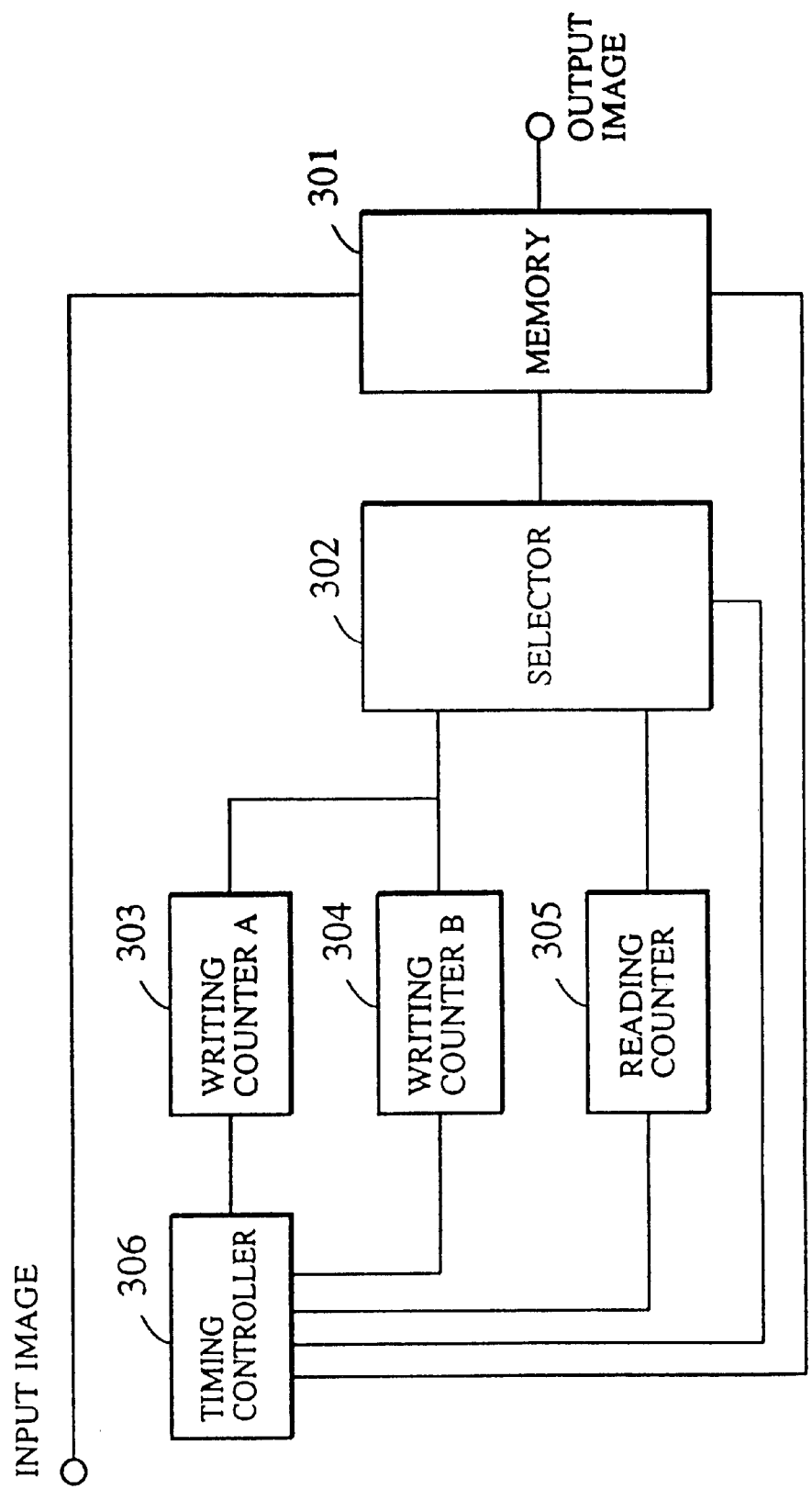
FIG. 12 is a block diagram of a fourth embodiment of the present invention.

FIG. 12 is a block diagram showing the structure of a printer portion 113 of a fourth embodiment of the present invention. The process shown in FIG. 12 is reception of image data and sending of the data to the recording head portion. The other structure of an ink jet type copying machine of this embodiment is the same as that shown in FIGS. 16 through 19, description thereof being omitted.

Reference numeral 301 denotes a memory for storing images. Reference numerals 303 and 304 respectively denote address counters used to write image data in the memory 301. Reference numeral 305 denotes an address counter used to read image data from the memory 301. Reference numeral 302 denotes a selector for selecting the address supplied to the memory 301 according to writing in the memory 301 or reading from the memory 301. Reference numeral 306 denotes a timing controller for controlling the operation of the respective components.

In this embodiment, if the recording pixels of the recording heads are 128 pixels and if the reduction rate is down to 50% which is decremented by 1%, the minimum required capacity of the memory 210 is the amount of image data output in one reading operation when the reduction rate is 99%. Since the 127 or 126 pixels is read in one reading operation at a reduction rate of 99%, the required capacity of the memory is at least (the width of 127 pixels×the horizontal scanning width).

In this embodiment, the capacity of the memory 301 corresponds to the amount of data indicated by the width of 128 pixels×the horizontal scanning width.

The write counter 303 is a horizontal scanning counter which performs counting at every 128 pixels (at every reading width) containing the effective and idle data. The write counter 304 is a bandwidth counter which performs counting up to a predetermined value at every one pixel of the effective data. A combination of the write counters 303 and 304 determines the writing address in the memory 301. The output of the write counter 303 is supplied to the upper position, while the output of the write counter 304 is supplied to the lower position.

The read counter 305 performs counting at every one address of the memory 301 when image data is sequentially read from the memory 301.

(The operation of life-size recording)

For life-size recording, image data is written in the memory 301 and the written data is immediately read out, whereby the input image data is sent to the recording portion without change.

(The operation for reduction recording)

First, the operation will be outlined.

At a reduction rate of, for example, 75%, the effective pixels in the first reading operation are 96 pixels=128×75%.

In the first reading, image data corresponding to the width of 96 pixels is stored in the memory 301. When the second reading is completed, the amount of image data stored in the memory 301 reaches 96+96=192=128+64, in which the width of 128 pixels is recorded and the width of 64 pixels is stored again in the memory 301.

In other words, in the image data obtained by the second reading, 32 pixels are recorded, and the remaining 64 pixels are stored in the memory 301.

When the third reading is completed, the amount of image data in the memory reaches 64+96=128+32, in which 128 pixels are recorded while 32 pixels are stored in the memory 301.

In the fourth reading, the amount of pixels in the memory becomes 32+96=128, all of which is recorded in one recording operation.

In the fifth reading, storage in the memory 301 is performed in the same manner as that of the first reading.

Thereafter, a series of above-described operations are repeated to complete recording of an image of a single page.

Figure 13:
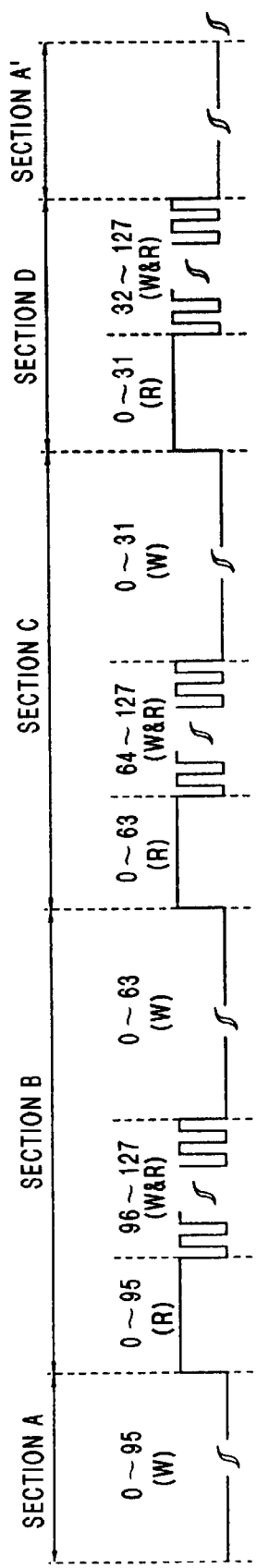
FIG. 13 is a timing chart showing the operation of the fourth embodiment of the present invention.

FIG. 13 illustrates the operation of the first single period of each band. The operation of the fourth embodiment will be described below in detail with reference to FIG. 13. Section A represents the operation for the first scanning in which only writing in the memory 301 is performed. At that time, since the band width to be written is 96 pixels, the write counter 304 counts up to 95 starting with 0.

First, the address supplied to the memory 301 is set to 0 by clearing the write counters 303 and 304, and writing is instructed to the memory 301, whereby image data is written while the address is sequentially counted up. In section A, actual recording is not performed, and only storage of the image data in the memory 301 is performed. Therefore, the selector 302 is fixed to the side of the write counter.

Section B indicates the operation for the image obtained in the second scanning. The selector 302 is turned to the side of the read counter, and the image data stored in the first scanning is read.

When reading of the image data from address 0 to address 95 of the memory 301 is completed, writing in the memory 301 is started, and input image data is sequentially written in the memory 301 while the first 32 pixels are read.

Subsequently, the selector 302 is fixed to the side of the write counter, and the image data of the remaining 64 pixels is written from address 0 to address 63.

Setting of the write counter for that writing is 96. First, the write counter counts from 96 to 127, and then counts from 0 to 63.

The operation of section C is similar to the operation of section B. After image data from address 0 to address 63 has been read, writing in the memory 301 is started, and input image data is written from address 64 to address 127 while the data corresponding to the first 64 pixels is output. Thereafter, the image data representing the remaining 32 pixels is written from address 0 to address 31. In section D, since just 128 pixels are in the memory 301, writing which is to be conducted after sequential writing and reading are conducted concurrently is not conducted.

In section A', the operation which is exactly the same as that of section A is conducted. Thereafter, in sections B', C' and D', the operations of sections B, C and D are repeated.

In this embodiment, if the same addresses are used when writing and reading are concurrently and sequentially performed, a common counter may be used for both writing and reading. In that case, the provision of the selector 302 is eliminated.

Further, the portion of the image data on which writing and reading are concurrently performed may be output without being written in the memory 301 by switching over the output using, for example, the selector.

In this embodiment, a recording head for recording binary data is used, and the image signal is processed in the memory 301 in the form of a binary signal, as in the case of the conventional printer. However, the image signal may be a multilevel image signal, and a multilevel recording head may be used.

Further, since recording of 128 pixels is conducted at a high speed as compared with the time required for the horizontal scanning, sequential recording of 128 pixels one pixel at one time does not cause an image to be inclined. However, recording at every 128 pixels may also be conducted, as in the case of the conventional printer. This is achieved by providing a buffer behind the memory.

Fifth Embodiment

A full color copying machine to which the method of the fourth embodiment is applied will now be described. The structure of the full color copying machine of this embodiment is the same as that of the second embodiment shown in FIGS. 4 through 7, description thereof being omitted.

Figure 14:
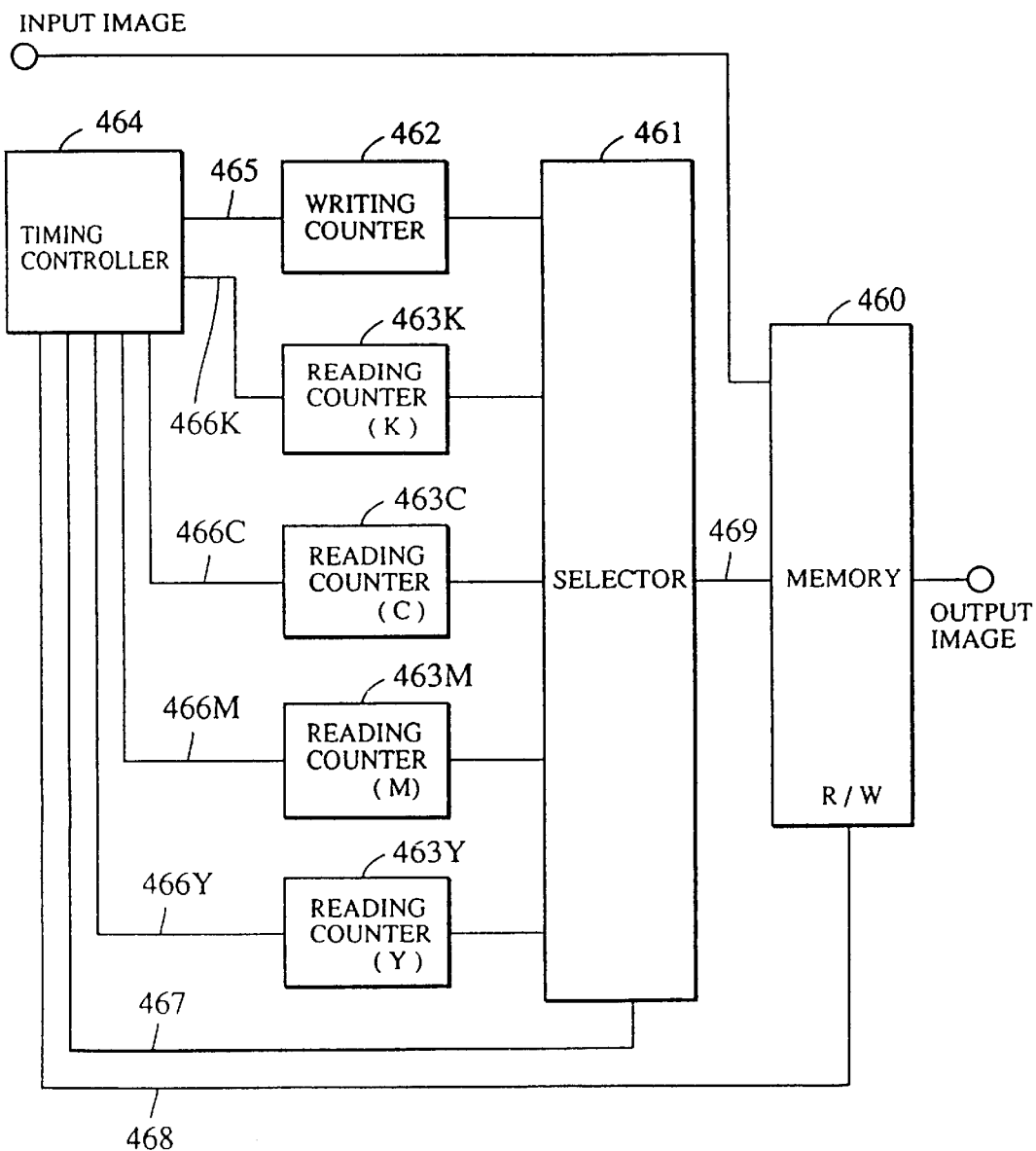
FIG. 14 is a block diagram of a fifth embodiment of the present invention.

FIG. 14 is a block diagram showing the circuit configuration of the vicinity of the memory buffer in this embodiment. The circuit shown in FIG. 14 also contains the function which carries out the present invention.

Reference numeral 460 denotes a memory for storing an image. Reference numeral 462 denotes an address counter for supplying an address to the memory 460 for writing of the image data therein. Reference numeral 463 denotes an address counter for supplying an address to the memory 460 for reading out of the image data therefrom. The address counter 463 includes an address counter 463K for black, an address counter 463C for cyan, an address counter 463M for magenta and an address counter 463Y for yellow. Reference numeral 461 denotes a selector for selecting the output of the writing counter or the output of the reading counter and for supplying the selected output to the memory 460 via a line 469. Reference numeral 464 denotes a timing controller which controls counting of the counters 462 and 463 via lines 465, 466K, 466C, 466M and 466Y and performs switching over of the selector and the memory between reading and writing via lines 467 and 468, respectively.

If the memory 460 is formed of a dual port RAM, the provision of the selector 461 is unnecessary.

The recording operation of the fifth embodiment will be described below.

(The operation for life-size recording)

For the life-size recording operation, the memory 460 is used as a delay buffer for correcting deviations of the positions of the respective heads. Since the timing for the life-size recording operation is the same as that shown in FIG. 8, description thereof is omitted.

(The operation for reduction recording)

In this embodiment, if the recording pixels of the recording head are 128 pixels in each color and if the reduction rate is down to 50% which is decremented by 1%, the minimum required capacity of the memory 460 is the amount of image data output in one reading operation when the reduction rate is 99%. Since the width of 127 or 126 pixels is read in one reading operation at a reduction rate of 99%, the total amount of image data at a reduction rate of 99% is (the width of 127 pixels×the horizontal scanning width).

In this embodiment, the amount of image data obtained at a reduction rate of 99% is adjusted to (the width of 128 pixels×the horizontal scanning width), and the capacity of the memory 460 is set to 2 bands with delay of the image data taken into consideration.

Figure 15:
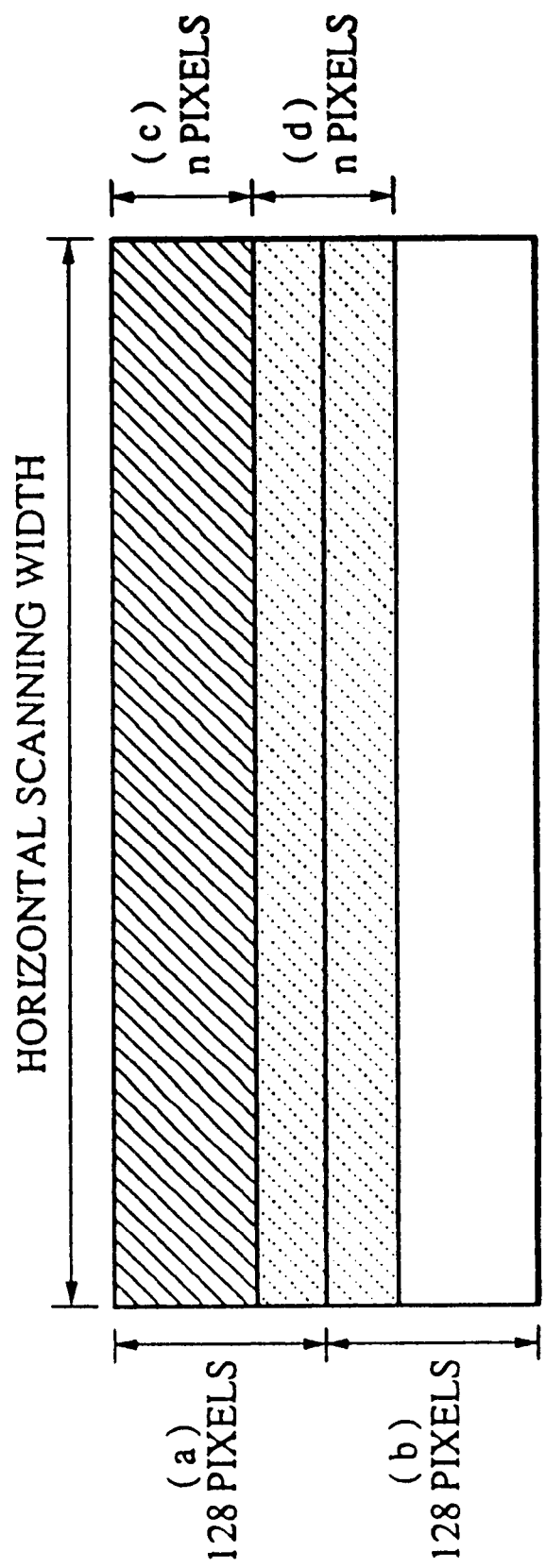
FIG. 15 illustrates the usage of a memory in the fifth embodiment of the present invention.

FIG. 15 is a schematic view illustrating the usage of the memory 460 in actual reading and reading for one color. In FIG. 15, (a) and (b) each indicate the memory of one band having the capacity indicated by the width of 128 pixels×the horizontal scanning width, (c) indicates the area where the read image date of the first band is stored, and (d) indicates the area where the read image data of the second band is stored. If the reduction rate is 75%, (c) and (d) each have the capacity indicated by the width of 96 pixels×the horizontal scanning width.

First, the operation will be outlined.

When the reduction rate is, for example, 75%, the effective pixels for each color in the first reading operation are 96 pixels=128×75%.

In the first reading, the image data corresponding to the width of 96 pixels is stored for each color in the memory area (c) shown in FIG. 15. When the second reading is completed, the amount of image data stored in the memory reaches 96+96=192=128+64, in which 32 pixels for each color are stored in the area (a)–(c) shown in FIG. 15. 128 pixels of each color stored in area (a) shown in FIG. 15 are recorded and the remaining 64 pixels for each color are stored in the first half of area (b) shown in FIG. 15.

In other words, in the image data obtained by the second reading, 32 pixels of each color are recorded, and the remaining 64 pixels of each color are stored in the memory.

When the third reading is completed, the amount of image data in the memory reaches 64+96=128+32, in which 128 pixels of each color are recorded while 32 pixels of each color are stored in the memory.

In the fourth reading, the amount of pixels in the memory becomes 32+96=128, all of which is recorded for each color in one recording operation.

Regarding the image data obtained in the fifth reading, only storage in the memory is performed in the same manner as that for the data obtained in the first reading.

Thereafter, a series of above-described operations are repeated to complete recording of an image of a single page.

FIG. 16 illustrates the operation timing of the fifth embodiment of the present invention. In the first scanning, 96 pixels of each color, which is 75% reduction of the read image of 128 pixels of each color, are written in the memory 460.

A writing counter 462 has a two-dimensional structure consisting of a horizontal scanning direction counting portion and a bandwidth direction counting portion, as in the same of the fourth embodiment, and operates in order to write image data in area (c) of FIG. 15. In other words, the bandwidth counter repetitively counts the effective image data from 0 to 95. The horizontal scanning counter performs counting at every 128 pixels including effective and idle pixels.

Regarding the image obtained in the second scanning operation, the writing counter operates in order to write image data in area (d) of FIG. 15. In other words, the bandwidth counter repetitively counts from 96 to 191 (a subsequent band memory 63), and the horizontal scanning counter performs counting at every 128 pixels.

A predetermined period of time after writing, reading of read counters (K) 463K, (C)463C, (M)463M and (Y)463Y is performed in that order to perform recording of the portion stored in (a) of FIG. 15.

In reading, since the memory has a capacity of 2 bands in this embodiment, recording may be performed after storage of image data in area (d) shown in FIG. 15 has been completed. Alternatively, the capacity of the image memory may be reduced according to a predetermined delay.

The writing counter 462 may also be a one-dimensional counter. There is no limitation to allotment of the memory address to the band.

Regarding the image in the third scanning operation, the image data having the width of 96 pixels is written in the remaining area shown in FIG. 15 and the first half of area (a). A predetermined period of time after writing, reading is performed to record the image data in area (b) shown in FIG. 15.

The recording operation of one page is thus performed.

In this embodiment, a recording head for recording binary data is used, and the image signal is processed in the memory 460 in the form of a binary signal, as in the case of the conventional printer. However, the image signal may be a multilevel image signal, and a multilevel recording head may be used.

Further, since recording of 128 pixels is conducted at a high speed as compared with the time required for the horizontal scanning, sequential recording of 128 pixels one pixel at a time does not cause an image to be inclined. However, recording at every 128 pixels may also be conducted, as in the case of the conventional printer. This is achieved by providing a buffer behind the memory.

Sixth Embodiment

Figure 17:
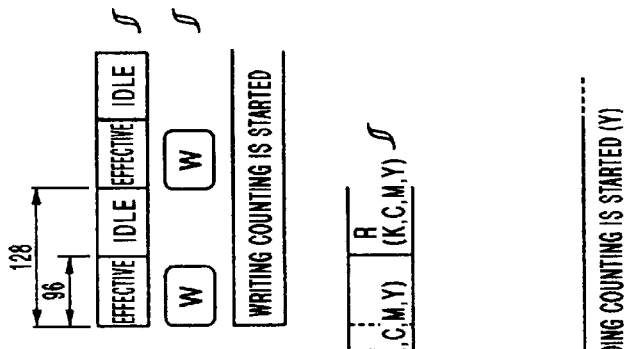
FIG. 17 is a timing chart showing the reduction copying operation of a sixth embodiment of the present invention.
Figure 18:
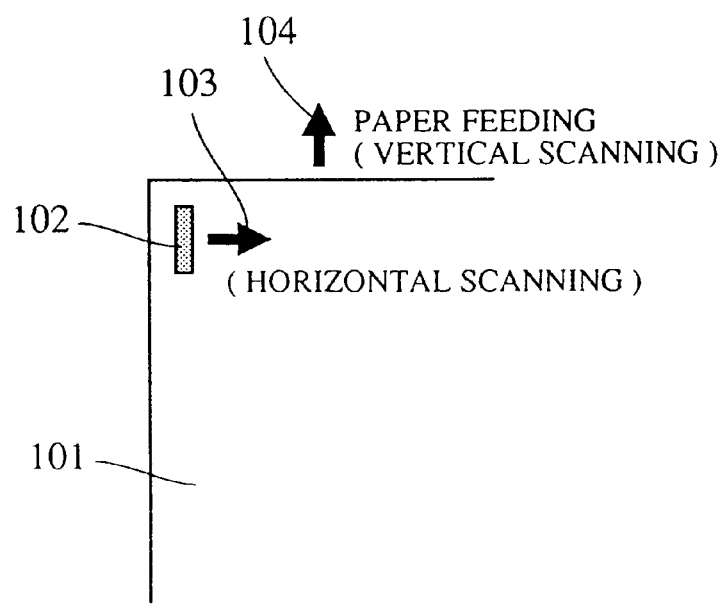
FIG. 18 illustrates image forming procedures of a conventional recording head and of the recording head used in the first embodiment of the present invention.
Figure 19:
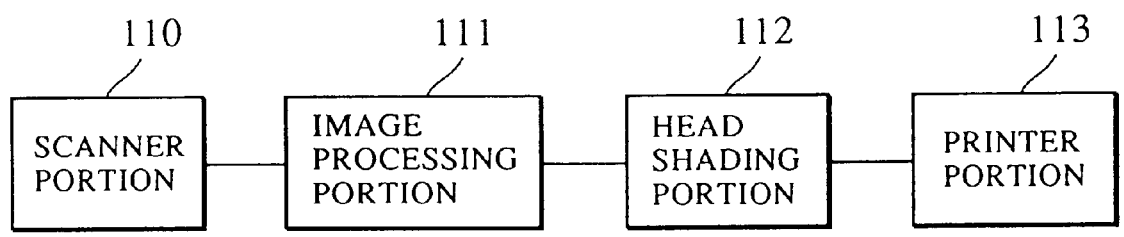
FIG. 19 is a block diagram of a copying machine.
Figure 20:
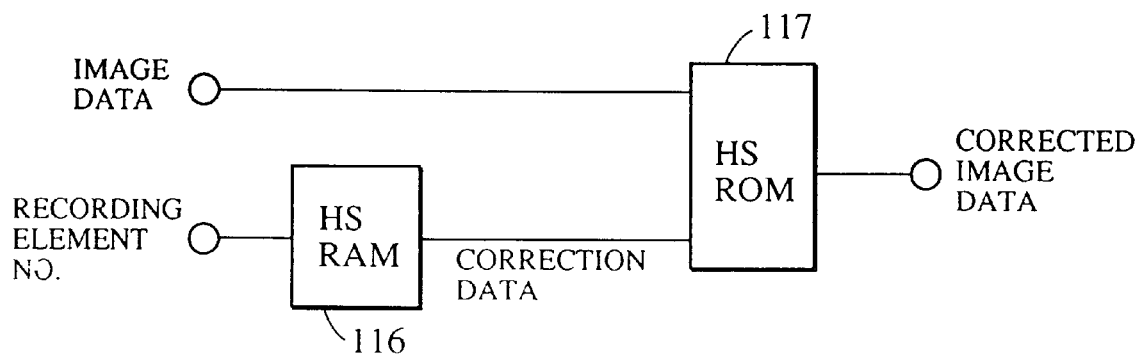
FIG. 20 shows the structure of a head shading portion.
Figure 21:
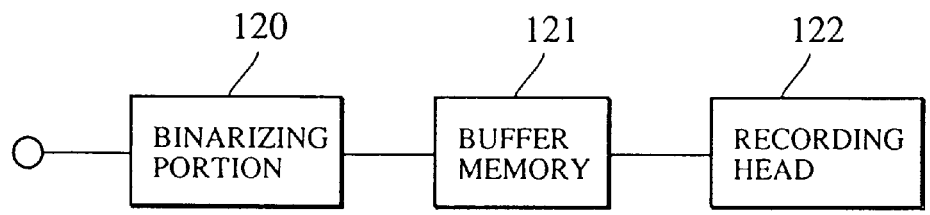
FIG. 21 shows the structure of a conventional printer portion.
Figure 22A:
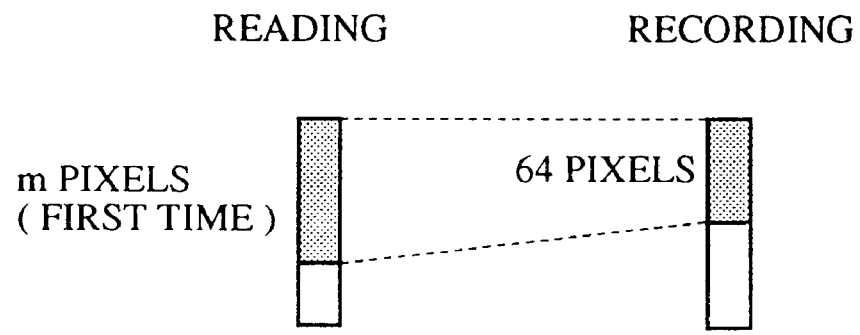
FIGS. 22(a) and 22(b) illustrate a conventional reduction method.
Figure 22B:
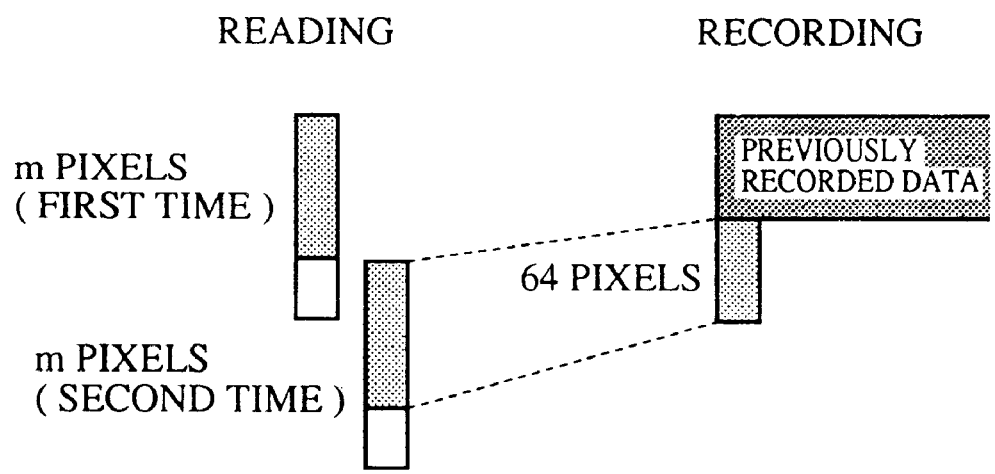

FIG. 17 illustrates the operation timing of a sixth embodiment of the present invention. The color printer of the sixth embodiment has a structure similar to that of the fifth embodiment, and the basic operation thereof is thus the same as that of the fifth embodiment.

However, the memory 460 has a capacity of at least two bands so that one band image data+$\alpha$ (which varies according to the amount of reduced image data stored in (c) or (d) shown in FIG. 15) can be stored beforehand while the recording medium is conveyed to a recording starting position in order to improve the throughput of the image formation.

In FIG. 17, the effective image obtained in the first scanning operation is written in area (c) shown in FIG. 15 and the effective image of the second scanning operation is written in area (d) shown in FIG. 15 in the same manner as that of the fourth embodiment.

Regarding the image data in the third scanning operation, the data in the memory 460 is first sequentially read in the order of black, cyan, magenta and yellow.

When at least one pixel of last yellow has been read and the memory 460 thus has a space, writing is enabled. Accordingly, image input is performed thereafter and the input image data is thus written in the memory 460 in the remaining area shown in FIG. 15 and the former half of area (a).

Regarding the fourth and subsequent scanning operations, at least one band image data may be stored and then recording may be performed, as in the case of the second scanning operation. Alternatively, reading may be performed while data is written in the memory, as in the case of the second scanning operation in the fourth embodiment.

In this embodiment, the ink jet recording type recording head, particularly, the bubble jet type recording head is used. This bubble jet type recording method assures high-density and high-definition recording.

The typical configuration or principles of that bubble jet type recording method are disclosed in, for example, U.S. Pat. Nos. 4,723,129 and 4,740,796. Although the principles disclosed in these patents are applicable to both on-demand type apparatus and continuous type apparatus, they are particularly effective when applied to an on-demand type because an on-demand type apparatus is constructed such that a bubble can be formed in a liquid (ink) in response to one driving signal applied to an electro-thermal transducer disposed in a liquid (ink) holding sheet or a liquid path. More specifically, when the at least one driving signal, corresponding to recording data and ensuring a rapid increase in the temperature of the ink exceeding a nucleate boiling, is applied to the electro-thermal transducer in the on-demand type apparatus, the electro-thermal transducer generates sufficient thermal energy to cause a film boiling of the recording liquid on the heat acting surface of the recording head, resulting in formation of a bubble in one-to-one correspondence to the driving signal in the recording liquid (ink). Expansion and contraction of the bubble generate a force which acts to discharge the recording liquid (ink) from the discharge opening so as to form at least one droplet of the recording liquid. Application of a driving signal in the form of a pulse is more desirable, because it assures expansion and contraction of the bubble on real-time basis and thus enables a droplet to be discharged with excellent responsiveness. Examples of suitable driving pulse signals are disclosed in U.S. Pat. Nos. 4,463,359 and 4,345,262. The quality of the recording can be further improved by adopting the conditions disclosed in U.S. Pat. No. 4,313,124 which is directed to the rate of temperature rise of the above-mentioned heat acting surface in the recording head.

The configuration of the recording head can be suitably determined by suitably designing the features of the discharge ports, liquid flow passages (straight or orthogonal) and electro-thermal transducers as they are disclosed in the aforementioned United States Patents. The present invention can also be applied to a feature disclosed in U.S. Pat. Nos. 4,558,333 and 4,459,600 in which the heat acting surface is disposed in a curved region, a feature disclosed in Japanese Patent Laid-Open No. sho 59-123670 in which a slit, which is common to a plurality of electro-thermal transducers, serves as the discharge portion thereof, and a feature disclosed in Japanese Patent Laid-Open No. sho 59-138461 in which an opening for absorbing a pressure wave of thermal energy corresponds to the discharge portion. In other words, a recording head of any type can be used, because the present invention assures reliable and effective recording.

The recording head used in the present invention may be of replaceable head type which can be electrically connected to and to which ink can be supplied from the apparatus body when connected to the apparatus body, or may be of cartridge type in which an ink supply tank is formed integrally with the recording head.

Further, there is no limitation to the type or number of recording heads mounted. For example, a single recording head corresponding to an ink of a single color may be provided. Alternatively, a plurality of recording heads respectively corresponding to inks having a plurality of recording colors or plurality of different densities may be provided.

Further, the present invention can also be applied to an ink jet recording method of the type which discharges an ink droplet using an electricity-mechanical energy converting element, such as a piezoelectric element, unlike the bubble jet type ink jet recording method, or to a thermal recording method in which recording is performed by a combination of a thermal head and an ink sheet or a sheet of heat-sensitive paper.

As will be understood from the foregoing description, when a width of the input image data is narrower than the maximum recording width at which the plurality of recording elements of the recording head can record in a single horizontal scanning operation, plurality of image data each having the narrower width are combined, and the plurality of recording elements are driven according to the combined image data to record an image. Consequently, generation of a stripe-shaped density irregularity, which would conventionally be generated in a recording operation in which the entire recording width of the recording head is not used, may be prevented.

Further, the image data is stored in storage means in an amount which is (N−1)/N of the image data amount with which the plurality of recording elements can record in a single horizontal scanning operation, subsequently input image data is combined with the image data stored in the storage means, and the combination of the image data is output to the recording head. Consequently, the above-described operation can be performed using storage means having a small capacity, and the image quality can thus be improved at a low cost.

Further, when a plurality of image data are combined so that recording can be performed at the maximum recording width of the recording head, the recording time can be shortened.

What is claimed is:

1. A method of recording an image representing input image data using a recording head in which a plurality of recording elements are arrayed in an array, said method comprising the step of repeating a recording operation which includes the substeps of:

inputting a plurality of groups of image data, each input group of image data corresponding to a recording width less than or equal to a predetermined recording width;

main scanning the recording head in a main scan direction different from that in which said plurality of recording elements are arrayed;

recording with the plurality of recording elements of the recording head, in a single main scanning step, an image having the predetermined recording width measured in a sub scan direction, the subscan direction being different from the main scan direction; and sub scanning by moving said recording head relative to a recording medium through a distance corresponding to the predetermined recording width after said main scanning substep is completed, wherein when a width of the groups of input image data is narrower than the predetermined recording width, two or more of the plurality of groups of input image data each having the narrower recording width are combined, and said plurality of recording elements are driven according to the combined groups of image data to record an image.

2. The image recording method according to claim 1, further comprising the steps of storing the groups of image data in storage means in an amount which is (N−1)/N of the image data amount with which said plurality of recording elements can record in a single main scanning substep, wherein N is the number of divisions of a recording head, N being a natural number of 2 or above, subsequently combining groups of input image data with the groups of image data stored in said storage means, and outputting the combination of the groups of image data to said recording head.

3. The image recording method according to claim 1, wherein a plurality of recording heads in each of which said plurality of recording elements are arrayed are provided.

4. The image recording method according to claim 3, wherein said plurality of recording heads are arrayed in such a manner that they are separated from each other in a direction of main scanning at predetermined distances.

5. The image recording method according to claim 4, wherein said plurality of recording heads record in recording colors which are different from each other.

6. The image recording method according to claim 4, further comprising the steps of storing the groups of image data in storage means for each of said recording heads in an amount which is (N−1)/N of the image data amount with which said plurality of recording elements can record in a single main scanning substep, wherein N is the number of divisions of each of the recording heads, N being a natural number of 2 or above, subsequently combining groups of input image data with the groups of image data stored in said storage means, and delaying the combination of the groups of image data by a time based on said predetermined distances and outputting the delayed combination to said recording head.

7. The image recording method according to one of claims 1 and 6, wherein said recording element records an image on the recording medium by discharging an ink droplet according to the image data.

8. The image recording method according to claim 7, wherein said recording element discharges the ink droplet by generating a change in a state of an ink using thermal energy.

9. A method of recording an image representing input image data using a recording head in which a plurality of recording elements are arrayed in an array, said method comprising the steps of repeating a recording operation which includes the substeps of:

inputting a plurality of groups of image data, each input group of image data corresponding to a recording width less than or equal to a predetermined recording width;

main scanning the recording head in a direction different from that in which said plurality of recording elements are arrayed, recording with said plurality of recording elements of said recording head, in a single main scanning step, an image having the predetermined recording width in a sub scan direction, the subscan direction being different from the main scan direction; and sub scanning by moving said recording head relative to a recording medium through a distance corresponding to the predetermined recording width after said main scanning substep is completed, wherein when a width of the groups of input image data is narrower than the predetermined recording width, two or more of the plurality of groups of input image data each having the narrower recording width are combined, and said plurality of recording elements are driven according to the combined groups of image data to record an image, and the groups of image data in the combined groups of image data which exceed said predetermined recording width are stored in storage means, subsequently input groups of image data are combined with the groups of image data stored in said storage means, and said plurality of recording elements are driven for recording according to the combined groups of image data.

10. The image recording method according to claim 9, wherein said storage means stores an amount of image data having a width which is equal to or less than the predetermined recording width.

11. The image recording method according to claim 9, wherein a plurality of recording heads in each of which said plurality of recording elements are arrayed are provided.

12. The image recording method according to claim 9, wherein said plurality of recording heads are separated from each other in a direction of said main scanning substep at predetermined distances.

13. The image recording method according to claim 12, wherein said plurality of recording heads record in recording colors which are different from each other.

14. The image recording method according to one of claims 12 and 13, further comprising the step of delaying supply of the image data to said plurality of recording heads by times based on said predetermined distances.

15. The image recording method according to claim 14, wherein said recording element records an image on the recording medium by discharging the ink droplet according to the image data.

16. The image recording method according to claim 15, wherein said recording element discharges the ink droplet by generating a change in a state of an ink using thermal energy.

17. The image recording method according to claim 9, wherein said recording element records an image on the recording medium by discharging an ink droplet according to the image data.

18. The image recording method according to claim 17, wherein said recording element discharges the ink droplet by generating a change in a state of an ink using thermal energy.

19. An image forming apparatus for recording an image on a recording medium using a recording head in which a plurality of recording elements are arrayed in an array, said apparatus comprising:

inputting means for inputting a plurality of groups of image data, each input group of image data corresponding to a recording width less than or equal to a predetermined recording width;

main scanning means for performing main scanning by moving said recording head in a main scanning direction different from that in which said plurality of recording elements are arrayed;

recording control means for controlling recording with said plurality of recording elements of said recording head, in a single main scanning, of an image having the predetermined recording width in a sub scan direction, the subscan direction being different from the main scan direction;

sub scanning means for performing sub scanning by moving said recording head relative to said recording medium through a distance corresponding to the predetermined width in the sub scanning direction after said main scanning is completed;

storage means for storing the input groups of image data; and data output means for combining the groups of image data stored in said storage means with subsequently input groups of image data when a width of the input groups of image data is narrower than said recording width of said plurality of recording elements of said recording head and for outputting the combination of the groups of image data as groups of image data representing a single main scanning, wherein said plurality of recording elements of said recording head are driven on the basis of the groups of image data output from said data output means.

20. The image recording apparatus according to claim 19, further comprising control means for storing in said storage means image data which exceeds the amount of image data corresponding to the single main scanning when the image data stored in said storage means is combined with the subsequently input image data.

21. The image recording apparatus according to claim 19, further comprising image reading means for reading an image of an original and for outputting the read image data to said storage means.

22. The image recording apparatus according to claim 19, wherein a plurality of recording heads in each of which said plurality of recording elements are arrayed are provided.

23. The image recording apparatus according to claim 22, wherein said plurality of recording heads are separated from each other in a direction of said main scanning operation at predetermined distances.

24. The image recording apparatus according to claim 23, wherein said plurality of recording heads record in recording colors which are different from each other.

25. The image recording apparatus according to one of claims 23 and 24, further comprising means for delaying supply of the group of image data to said plurality of recording heads by times based on said predetermined distances.

26. The image recording apparatus according to claim 25, wherein said recording element records an image on the recording medium by discharging an ink droplet according to the image data.

27. The image recording apparatus according to claim 26, wherein said recording element discharges the ink droplet by generating a change in a state of an ink using thermal energy.

28. The image recording apparatus according to any one of claims 19 to 24, wherein said recording element records an image on the recording medium by discharging an ink droplet according to the image data.

29. The image recording apparatus according to claim 28, wherein said recording element discharges the ink droplet by generating a change in a state of an ink using thermal energy.

30. The image recording apparatus according to claim 19, wherein said storage means can store the image data in an amount which is equal to or less than an amount with which said plurality of recording elements can record in a single main scanning.

31. The image recording apparatus according to claim 30, wherein said storage means can store the image data in an amount which is (N−1)/N (N: a natural number of 2 or above) of the amount with which said plurality of recording elements can record in a single main scanning.

\* \* \* \* \*

UNITED STATES PATENT AND TRADEMARK OFFICE
CERTIFICATE OF CORRECTION

PATENT NO. : 5,959,644

DATED : September 28, 1999

INVENTOR(S) : EIICHI MOTOYAMA, ET AL.

It is certified that error appears in the above-identified patent and that said Letters Patent is hereby corrected as shown below:

COLUMN 1:

Line 34, "pretermined" should read --predetermined--.

COLUMN 4:

Line 32, "are" should read --is--;
    Line 33, "are" should read --is;
    Line 50, "are" should read --is--; and
    Line 51, "are" should read --is--.

COLUMN 14:

Line 54, "width," should read --width;--; and
    Line 55, "stored," should read --stored;--.

COLUMN 19:

Line 59, "claim 14," should read --claim 9,--;

COLUMN 20:

Line 21, "sub scan" should read --subscan--;
    Line 24, "sub scanning" (both occurrences) should read --subscanning--.

UNITED STATES PATENT AND TRADEMARK OFFICE
CERTIFICATE OF CORRECTION

5,959,644

DATED : September 28, 1999

INVENTOR(S) : EIICHI MOTOYAMA, ET AL.

It is certified that error appears in the above-identified patent and that said Letters Patent is hereby corrected as shown below:

COLUMN 20:

```
Line 27, "sub scanning" should read --subscanning--;
Line 48, "input" should read --input groups of--; and
Line 65, "group" should read --groups--.
```

COLUMN 22:

```
Line 2, "image" should read --groups of image--; and
Line 7, "image" should read --groups of image--.
```

Signed and Sealed this

Twenty-fifth Day of July, 2000

Attest:

Q. TODD DICKINSON

*Attesting Officer*  *Director of Patents and Trademarks*